(12) United States Patent
Mihic et al.

(10) Patent No.: US 11,797,543 B2
(45) Date of Patent: Oct. 24, 2023

(54) SYSTEM AND METHOD FOR CASCADE ELIMINATION OF CANDIDATES IN SPATIAL RELATION OPERATIONS

(71) Applicant: Microsoft Technology Licensing, LLC, Redmond, WA (US)

(72) Inventors: Bosko Mihic, Belgrade (RS); Slobodan Djunic, Belgrade (RS); Mladen Andzic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 717 days.

(21) Appl. No.: 16/243,402

(22) Filed: Jan. 9, 2019

(65) Prior Publication Data

US 2020/0201869 A1 Jun. 25, 2020

Related U.S. Application Data

(60) Provisional application No. 62/782,941, filed on Dec. 20, 2018.

(51) Int. Cl.
*G06F 16/2457* (2019.01)
*G06F 16/29* (2019.01)
*H04L 67/10* (2022.01)

(52) U.S. Cl.
CPC ........ *G06F 16/24575* (2019.01); *G06F 16/29* (2019.01); *H04L 67/10* (2013.01)

(58) Field of Classification Search
CPC ............................ G06F 16/29; G06F 16/24575
See application file for complete search history.

(56) References Cited

U.S. PATENT DOCUMENTS

| 8,275,800 B1 * | 9/2012 | Virgil | G06F 16/29 707/798 |
| 9,104,770 B2 * | 8/2015 | Hu | G06V 10/457 |
| 10,311,169 B1 * | 6/2019 | Leedom | G06F 30/20 |

(Continued)

OTHER PUBLICATIONS

"International Search Report and Written Opinion Issued in PCT Application No. PCT/US2019/065834", dated Mar. 3, 2020, 11 Pages.

(Continued)

*Primary Examiner* — Mark D Featherstone
*Assistant Examiner* — Tony Wu
(74) *Attorney, Agent, or Firm* — Weaver IP L.L.C.

(57) ABSTRACT

Methods for cascade elimination of candidates in spatial relation operations are performed by systems, devices, and apparatuses. Spatial relation operations include counts of geometric objects against geographies/geometries, and data points associated with vertices of shapes representing the geographies/geometries are reduced to form smaller sets of data points that represent the initial shapes. Elimination of geometric objects for operations is performed using inner- and outer-reductions in cascade. Data points are reduced until a representation of the original shape with a specified area or number of data points is generated. Multi-polygon geometries are joined by union based on preservation of area and data points of the polygons therein prior to reducing data points. Cascade reductions are also performed at specified times during spatial operations based on costs associated therewith.

20 Claims, 7 Drawing Sheets

(56) References Cited

U.S. PATENT DOCUMENTS

| | | | |
|---|---|---|---|
| 2004/0148277 A1* | 7/2004 | Gray | G06F 16/29 |
| 2004/0215641 A1 | 10/2004 | Kothuri et al. | |
| 2005/0219237 A1* | 10/2005 | Doi | G06T 17/20 |
| | | | 345/419 |
| 2009/0088962 A1* | 4/2009 | Jones | G06F 16/9537 |
| | | | 701/519 |
| 2015/0186910 A1* | 7/2015 | Cruickshank | G06Q 30/0205 |
| | | | 705/7.34 |
| 2016/0300341 A1* | 10/2016 | Hay | G06F 16/7335 |
| 2019/0287299 A1* | 9/2019 | Wu | G06T 17/00 |
| 2020/0086855 A1* | 3/2020 | Packer | G08G 1/161 |

OTHER PUBLICATIONS

Kothuri, et al., "Efficient Processing of Large Spatial Queries Using Interior Approximations", In Proceedings of the 7th International Symposium on Advances in Spatial and Temporal, Jul. 12, 2001, pp. 404-421.

* cited by examiner

SYSTEM AND METHOD FOR CASCADE ELIMINATION OF CANDIDATES IN SPATIAL RELATION OPERATIONS

CROSS-REFERENCE TO RELATED APPLICATION(S)

The present application claims priority to U.S. Provisional Patent Application No. 62/782,941, entitled "SYSTEM AND METHOD FOR CASCADE ELIMINATION OF CANDIDATES IN SPATIAL RELATION OPERATIONS," filed on Dec. 20, 2018, the entirety of which is incorporated by reference herein.

BACKGROUND

A geometry approximates or represents a spatial area or region, such as a geographic area. A geometry may be defined by an inner- and/or outer-perimeter composed of line-figure or curve segments connected between points referred to as "vertices." A spatial relation check determines a relationship between an original geometry and one or more additional geometries of interest. For example, a database server may perform a spatial relation check to determine whether a geometry that represents a geographic region contains spatial objects, such as city boundaries or point locations. Spatial objects that do not meet the condition are filtered out of the final operational result.

Currently, spatial relation checks are performed using rudimentary indexing. Filtering based on spatial relation checks is typically split on index coarse selection phases and fine filtering of spatial objects based on exact spatial relation intrinsic calls. Examples of coarse selections include spatial indexing with bounding box checks, R-trees, or spatial tessellations, while fine filtering may include intrinsic calls such as "geo1.Contains/.Intersects/.Within(geo2)." These standard solutions for spatial relations are designed for point lookups with small numbers of spatial intrinsic calls.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, devices, and apparatuses for cascade elimination of candidates in spatial relation operations are disclosed herein. A spatial region (also referred to as "geometry") has a boundary and an area defined by data points in the form of a set of connected vertices. Queries specifying spatial relation operations can be made against the data points for a known set of geometric objects that are candidates to satisfy a specific condition for a spatial relation with respect to a spatial region. In performing spatial relation operations, the boundaries (e.g., line-figures and/or vertices making up a perimeter) that define a spatial region and its area are simplified as modified spatial regions and then processed to make determinations as to whether candidate geometric objects satisfy the spatial relation.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
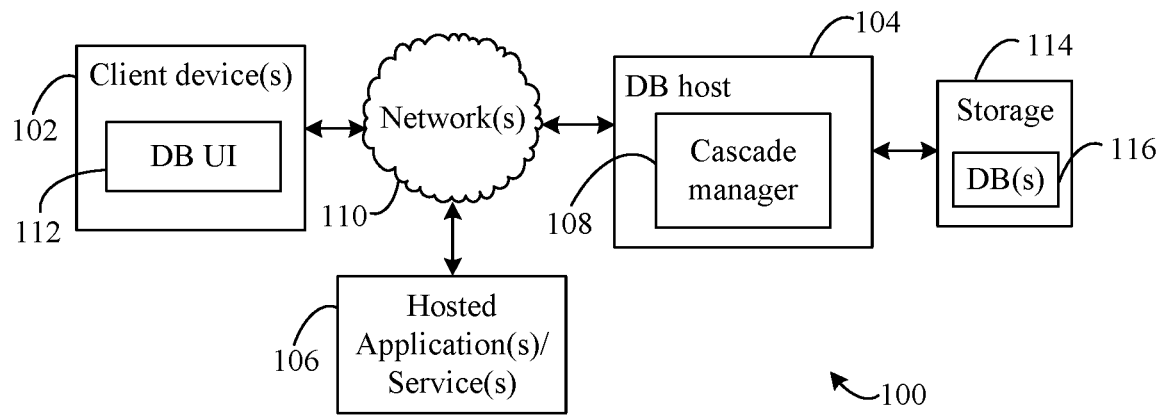
FIG. 1 shows a block diagram of a networked system for cascade elimination of candidates in spatial relation operations, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for cascade elimination of candidates in spatial relation operations. Specifically, Section II.A describes embodiments for inner- and outer-reductions, Section II.B describes cost model embodiments, and Section II.C describes embodiments for multi-polygon geometries and unions. Section III below describes example mobile device and computing device embodiments that may be used to implement features of the embodiments described herein. Section IV below describes additional examples and advantages, and Section V provides some concluding remarks.

II. Example Embodiments for Cascade Elimination of Candidates in Spatial Relation Operations Methods, systems, apparatuses, devices, and computer program products are provided herein for cascade elimination of candidates in spatial relation operations. A spatial region (also referred to herein as "geometry") has a boundary and an area defined by data points in the form of a set of connected vertices. Such geometries may represent a geographic region or another geometric region. Queries specifying spatial relation operations can be made against the data points for a known set of geometric objects that are candidates to satisfy a specific condition for a geometry with respect to a spatial region. Spatial relation operations include counts of such candidate geometric objects that satisfy the specific condition, including but not limited, operations for 'within', 'contains', 'intersects', and/or the like, including equivalents.

Data points associated with vertices of geometries may be reduced to form modified geometries with smaller sets of data points, and thus fewer sides/vertices, that still represent the initial geometry. These reductions are performed using single side reductions, such as cascades of inner- and outer-reductions. Data points are reduced until a modified representation of the geometry with a specified area or number of data points is generated. The reduction of data points lowers the processing resource/time required to perform spatial relation operations which in turn are used for determinations of true positive/true negative spatial relation results to eliminate resultant geometric objects from further operation processing.

Multi-polygons are single geometries that comprise two or more independent, non-overlapping polygons. The two or more polygons may be related to a common geography or geometry, for example. According to embodiments, multi-polygon geometries may be joined by unions which may be performed based on preservation of area and data points of the polygons therein prior to, or while, reducing data points for spatial relations operations. Individual polygons in a multi-polygon geometry are initially non-overlapping, but may be brought together as a single modified polygon (e.g., a new geometry) which may then have data points reduced for performing cascade eliminations of geometric objects, as described herein.

Cascade reductions may be performed/implemented on a per-candidate geometric object basis. For example, in performing a spatial relation operation for a given geometric object, one or more single side cascade reductions may be performed for the processing. When operation processing for the given geometric object is complete, the next geometric object is processed for the operation, and again cascade reductions may be performed. For the next geometric object, one or more of the cascades for the prior geometric object may be used in the processing as such cascades have already been determined. It should be noted, however, that additional cascades may also be performed for the next, and/or for subsequent, geometric objects. Iterations of cascades may include nested loops for operations to count relations between a geometry and geometrics objects of interest where a nested loop may comprise 'm' by 'n' loops where there are 'm' outer iterations and 'n' inner iterations, and cascades are calculated for the outer loop geometries. Such embodiments are described in further detail below.

Cascade reductions may also be performed at specified times during spatial operations based on cost models associated with the execution of the spatial operations and with the execution of single side reductions. Cost models described herein may be based on resources costs associated with single side reductions and an original cost of the spatial operation on the geometry. Cascade reductions may also be performed periodically and/or serially, in embodiments. Iteratively repeating such reductions, as cascades, based on cost models allows for much more efficient processing of the spatial operation, e.g., for big data stores. That is, large numbers of the candidate geometric objects can be eliminated from further processing of the operation by performing the spatial relation operation against a modified geometry defined by fewer data points, which requires significantly less processing.

Generally, a spatial query specifies a spatial relation operation which checks/calculates spatial relationships between a specified geometry and a set of N other spatial geometry objects (or candidates) to be checked as satisfying, or not satisfying, the spatial relation operation. The specified geometry in the spatial query may be referred to as an 'original' geometry. This calculation of relationships may include processing portions within a main, or overall, operational processing. For instance, cascades may be calculated during the main processing using the single side reductions that are simplified versions of the original geometry. As an example, an inner- and an outer-cascade may be calculated where the cascades have far fewer data points corresponding to vertices than the original geometry. Any geometric objects/candidates which satisfy the queried relationship with the inner cascade, also satisfy the queried relationship with the original geometry and may be designated as true positives for the relation. An inner cascade, which is much cheaper because of the smaller number of points, may thus be used first to check the relationship, and thus if a number N1 of geometric objects/candidates satisfy the relationship with the inner cascade, a result for the N1 geometric objects is complete, and for those N1 geometric objects no further processing for the spatial operation is required for the main processing of the operation.

For the remaining geometric objects (the difference between N and N1) that do not satisfy the relationship with the inner cascade, it cannot yet be determined if they satisfy the relationship with the original geometry. Therefore, the remaining geometric objects are checked for the relation based on the outer cascade. If the remaining geometric objects do not satisfy the relationship with the outer cascade, they also do not for the original geometry either and may be designated as true negative results. Accordingly, a number N2 of the remaining geometric objects do not satisfy the relationship with inner cascade, also do not for the outer cascade, and the operation for the N2 geometric objects is complete. For the still remaining geometric objects (i.e., the difference between N and (N1+N2)) that do not satisfy the relationship with the inner cascade, but do for the outer cascade, a check of the relation against the original geometry may be performed. Therefore, prior to checking the relation of geometric objects with the original geometry, N1+N2 results have already been determined on the basis of a much cheaper check based on the cascades. The process of checking relationships first with the simpler geometries of the cascades, and then with the more complex original geometry, is referred to herein as cascade elimination.

Spatial windows may be areas (e.g., comprised of "surfaces") of geometries or geographies that may be represented by one or more polygons. The embodiments herein provide for improvements to system operations for operating on sets of spatial data, including large datasets or "big data," based on their relation with some spatial window (e.g. state.Contains(building)=true). In embodiments, evaluating such expressions (e.g., in post-index spatial relation calls) is performed in coarse-to-fine fashion through simplified cascades for original query window spatial objects, e.g., geometric objects. A novel spatial intrinsic call for single-side reductions enables the creation of simplified and modified geometries/polygons from original ones, where bounding curve points of the originals are dropped if an area 'delta' would be kept strictly from inner-/outer-side reductions and below a threshold value (or with a tolerance). Such an approach preserves both the positive and the negative result transitivity of geometric objects. That is, iterative cascade elimination of geometric objects by operating over inner- and outer-cascade reductions efficiently and accurately handles true positive and true negative relations of geometric objects, e.g., points, lines, geometric shapes, other geometric representations, and/or the like, with respect to geometries, e.g., polygons, multi-polygons, other geometries, etc. In this way, fast pass/fast fail paths that are orders of magnitude faster with respect to processing are generated, while preserving functional correctness and robustness of the operations and reducing the required processing cycles for the operations.

As noted, embodiments herein may be based on single side (i.e., inner/outer) reductions that reduce the maximum number of points of the original geometry for a selected area "delta" or difference, while generating output geometry contained inside original windows (inner-reduction), or containing original windows (outer-reduction). The selected area delta may be a percentage, or ratio, of the original geometry such that cascades of inner-/outer-reductions produce modified versions/representations of the original geometry that are with the percentage of the original geometry area. Similarly, embodiments are extendable to 2-D and 3-D graphics (e.g., topography, etc.), and other types of multi-dimensional spatial relationships.

Thus, the described embodiments mitigate the performance bottlenecks of spatial data querying for very large analytical datasets where primary filtering such as spatial indexing is inadequate for operations. The embodiments also create even larger gains with respect to processing efficiency in big data spaces where spatial data is rarely indexed. That is, unlike conventional approaches that can only be applied for point lookups where the number of calls to a spatial intrinsic is relatively small, the described embodiments allow for handling of analytical workloads on top of spatial data (e.g. group all cars/devices/properties by state/zip code/county) where coarse index filtering requires significant processing for spatial relation intrinsic calls, and the optimizations of the described embodiments provide for significant computational performance gains.

Simply put, the combination of generating and using inner/outer spatial objects for performing cascade eliminations of true positive/true negative results from further consideration in operational processing, before applying the relation check operation, reduces the required system resources necessary. Additionally, a costing model for estimating an optimal time to add a new cascade increases flexibility of operations and efficacy of reductions by evaluating reduction parameters in cases when cardinality estimation is not reliable. Still further, novel buffering techniques to handle "contains" transitivity in the space of finite-precision data also increases the robustness of the embodiments.

Geometries are composed of a number of shapes, e.g., one or more, where each shape is composed of a number of line-figures which determine the boundary of the geometry. Each figure may thus be defined by an array of data points corresponding to vertices between which are line-figures. Additionally, the term "polygon" may be illustratively used to refer to a geometry comprised of line-figures and vertices herein for various described examples, but the embodiments are not so limited. That is, when a polygon is described, it is contemplated that multi-polygons and other geometries and shapes are also applicable for embodiments. Likewise, multi-polygon geometries may be referred to in the description inclusive of, and without excluding, polygons. Furthermore, spatial operations may include various types of operations, such as but not limited to, "contains," "within," "intersects," and/or the like, including equivalents.

Accordingly, systems and devices may be configured in various ways for cascade elimination of candidates in spatial relation operations.

For instance, FIG. 1 is a block diagram of a networked computing system 100 ("system 100" hereinafter), according to embodiments. System 100 is configured to cascade elimination of candidates in spatial relation operations, according to embodiments. As shown in FIG. 1, system 100 includes a client device 102, a database (DB) host 104, and a hosted application(s)/service(s) 106, which may communicate with each other over a network 110. In embodiments, hosted application(s)/service(s) 106 may be associated with one or more databases. It should be noted that any numbers of client devices, DB hosts, and/or hosted applications/services may be present in various embodiments. Additionally, any combination of the components illustrated in FIG. 1 may be present in system 100, according to embodiments.

As noted above, client device 102, DB host 104, and hosted application(s)/service(s) 106 are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

DB host 104 may comprise one or more server computers or computing devices, which may include one or more distributed or "cloud-based" servers. In embodiments, DB host 104 may be associated with, or may be a part of, a cloud-based service platform such as Microsoft® Azure® from Microsoft Corporation of Redmond, Wash. DB host 104 may be configured to include multiple processing systems and/or processors for cascade elimination of candidates in spatial relation operations. DB host 104 may also include a storage 114, that may be internal or external (as shown) to DB host 104, and that stores one or more databases (DB(s)) 116 against which queries may be performed according to the described embodiments herein, including by not limited to queries for spatial operations on datasets stored in DB(s) 116 against geometries/geographies. For example, databases may include information for which spatial relations may be determined, including but without limitation, data associated with locations that may be within, or outside of, regions defined by polygons. DBs as described herein generally refer to and include, but are not limited to, structured and un-structured data stores, big data stores, data in comma-separated value (CSV) formats, structured and unstructured text, open source standard formats (such as Apache Parquet™, etc.), log file dumps of Internet of Things (IoT) devices into network folders, and/or any other type of data files that may be queried, extracted, and/or parsed, e.g., for cascade elimination of candidates in spatial relation operations according to the described embodiments. That is, DBs include any type of data format and/or storage location. Storage 114 may be any type of storage device or array of devices, configured for any type of data format, and while shown as being communicatively coupled to DB host 104 outside of network 110, storage 114 may be networked storage that is accessible via network 110.

Hosted application(s)/service(s) 106 may be one or more of any type of application and/or service for which DB(s) 116 is associated. For example, hosted application(s)/service(s) 106 may be one or more applications and/or services hosted by Microsoft® Azure®. DB(s) 116 for hosted application(s)/service(s) 106 may include datasets storing data associated therewith, including but not limited to, data and information for which spatial relation operations are to be performed. In embodiments, hosted application(s)/service(s) 106 may also or alternatively include applications and/or services that are stand-alone rather than hosted.

Client device 102 may be any type of computing device or computing system, including a terminal, a personal computer, a laptop computer, a tablet device, a smart phone, a personal digital assistant, and/or the like that may be utilized to query a database. In embodiments, client device 102 may be used by an administrator, support staff, customers, and/or clients associated with datasets stored in DB(s) 116. Queries to DB(s) 116 may be performed via DB host 104 and/or via a DB user interface (UI) 112 of client device 102. DB UI 112 may include one or more components to enable a user thereof to provide queries/requests, e.g., queries for spatial relation operations such as, but not limited to, queries serviced via cascading elimination of candidates, according to embodiments. An instance of DB UI 112 may be present in DB host 104 in some embodiments.

Client devices and DB hosts described herein may be configured to execute software applications/services for cascade elimination of candidates in spatial relation operations. For example, a cascade manager 108 may be a software application/service so configured. As illustrated, DB host 104 may include an instance of cascade manager 108. Cascade manager 108 may be a part of an operating system (OS), a database server package, and/or an application installed at a computing system, may be an application/service itself, etc., in various embodiments. Cascade manager 108 is configured to perform spatial relation operations, including elimination of candidates via cascades, as described in further detail herein. In some embodiments, cascade manager 108 may be dedicated hardware circuitry, as described below.

For example, when a query for a spatial operation is provided to DB host 104 from client device 102 for execution against DB(s) 116, cascade manager 108 may be configured to receive the incoming query and determine spatial operation results via cascade elimination of candidates for a dataset in DB(s) 116. The determination of spatial operation results via cascade elimination of candidates may be performed against one or more datasets stored in DB(s) 116, and may be based on geometries and/or geographies represented by polygons.

For instance, a locational dataset may include data related to geometric objects of objects of interest, e.g., representations of candidates such as geographic coordinates, people, vehicles, airplanes, roads, rivers or other bodies of water, packages/mail for delivery, buildings, power grids, counties, states, provinces, countries and/or the like. A query may specify that a spatial relation operation be performed for geometric objects against an original polygon or other original geometry that may represent geographic/geometric areas. For instance, it may be determined if geometric objects or specified objects are within an area of a geometry, are contained by the geometry, intersect the geometry, etc. A spatial relationship may be determined efficiently via cascade manager 108, even for big data storage with billions or hundreds of billions of raw data entries against geometries with hundreds of thousands of vertices/line-figures, using cascade elimination of candidates through single side reductions of data points corresponding to vertices for the geometry, according to the embodiments herein.

Cascade manager 108 may be implemented in hardware, hardware combined with one or both of software and/or firmware, and/or as program instructions encoded on computer-readable storage media, and may be configured to perform any functions and/or operations described herein associated with cascade elimination of candidates in spatial relation operations. In embodiments, an instance of cascade manager 108 may be implemented in hosted application(s)/service(s) 106 and/or client device(s) 102. In such an example, hosted application(s)/service(s) 106 and/or client device(s) 102 may receive queries from devices/systems as shown in FIG. 1 according to embodiments herein. Additionally, one or more portions of cascade manager 108 may be distributed or duplicated between DB host 104 and hosted application(s)/service(s) 106 in various implementation examples.

It should be noted that as described herein, embodiments of DB host 104 are applicable to any type of system architecture in which datasets, including very large datasets like big data, are queried for spatial relation operations. One example noted above is where DB host 104 is a "cloud" implementation or service in a network architecture/platform. A cloud platform may include a networked set of computing resources, including servers, routers, etc., that are configurable, shareable, provide data security, and are accessible over a network, such as the Internet. Cloud implementations/services for embodiments may run on these computing resources, often atop operating systems that run on the resources, for entities that access the implementations/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

Figure 2:
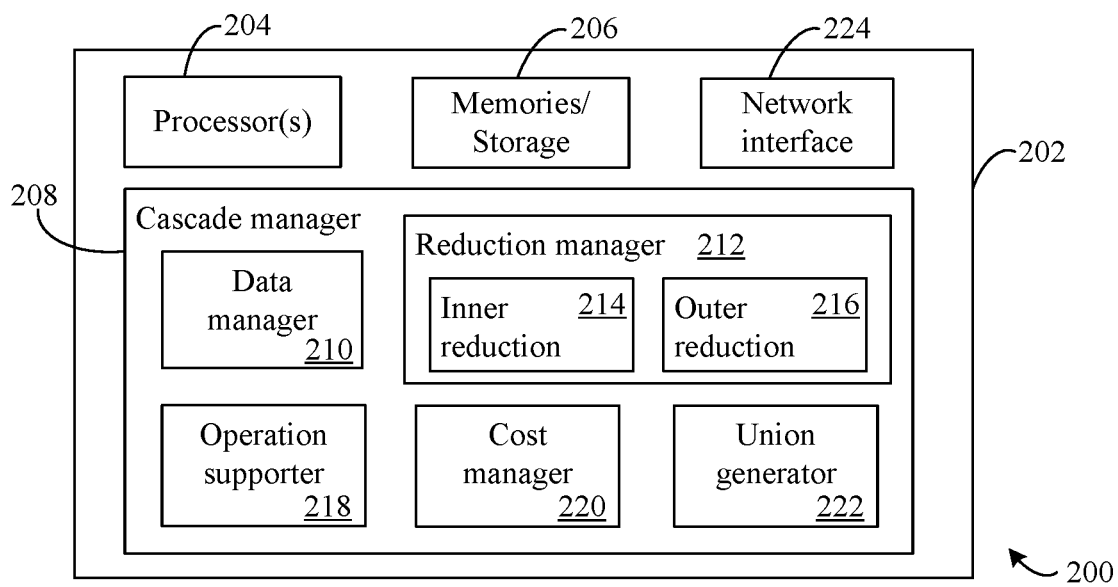
FIG. 2 shows a block diagram of a computing system for cascade elimination of candidates in spatial relation operations, according to an example embodiment.

Accordingly, a processing system such as DB host 104 may be configured in various ways for improvements and enhancements in cascade elimination of candidates in spatial relation operations. For example, FIG. 2 is a block diagram of a system 200 configured for such improvements and enhancements. System 200 may be an embodiment of system 100 of FIG. 1, e.g., DB host 104. System 200 is described as follows.

System 200 includes a computing device 202, which may be any type of computer or computing device such as a server(s), as mentioned elsewhere herein, or as otherwise known. As shown in FIG. 2, system 200 and computing device 202 include one or more of a processor ("processor") 204, one or more of a memory and/or other physical storage device ("memory") 206, one or more network interfaces ("network interface") 224, and a cascade manager 208. System 200 may also include one or more databases (e.g., as shown in FIG. 1, DB(s) 116) which may be stored in memory 206. System 200 may also include additional components (not shown for brevity and illustrative clarity) including, but not limited to, components and subcomponents of other devices and/or systems herein, as well as those described below with respect to FIG. 11, such as an operating system, etc.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of cascade manager 208, which may be implemented as computer program instructions for cascade elimination of candidates in spatial relation operations, e.g., via single side reductions, etc., as described herein. Memory 206 is configured to store such computer program instructions/code, as well as to store other information and data described in this disclosure including, without limitation, cost models, generated cascades, etc.

Network interface 224 may be any type or number of wired and/or wireless network adapter, modem, etc., configured to enable system 200 to communicate with other devices over a network, such as communications between system 200 and other devices utilized in a network, including systems and devices shown in FIG. 1.

Cascade manager 208 includes a plurality of components such as software logic and/or hardware logic for performing the functions and operations described herein for cascade elimination of candidates in spatial relation operations. As shown, cascade manager 208 includes a data manager 210, a reduction manager 212, an operation supporter 218, a cost manager 220, and a union generator 222. Accordingly, cascade manager 208 may operate in various ways to enable cascade elimination of candidates in spatial relation operations. That is, system 200 and cascade manager 208 are configured to reduce data points corresponding to vertices of an original polygon for which a spatial relation operation is performed, and then eliminate candidate geometric objects for the operation using the simplified polygon. In embodiments, the data points may be reduced using single side inner-/outer-reductions to generate simplified, modified polygons that represent the original polygon. Accordingly, the number of data points/vertices that need to be processed in the spatial relation operation may be greatly reduced, which significantly lowers the required processing cycles for operations. Efficiency is even further increased for polygons with thousands to hundreds of thousands (or more) vertices, and/or for very large datasets of geometric objects such as those associated with big data stores. Using a modified polygon with reduced vertices thus allows for less processing required in a given spatial operation, and the elimination from further processing of geometric objects for which a true-positive or a true-negative spatial result is obtained based on the rejection increases efficiency and decreases required processor and memory resources for processing the remaining geometric objects.

While shown separately for illustrative clarity, in embodiments, one or more of data manager 210, reduction manager 212, operation supporter 218, cost manager 220, and/or union generator 222, may be combined together and/or as a part of other components/logic of system 200. In some embodiments, less than all of the components/logic of cascade manager 208 illustrated in FIG. 2 may be included. In software implementations, one or more components/logic of cascade manager 208 may be stored in memory 206 and are executable by processor 204.

Data manager 210 may be configured to access datasets in a DB for performance of spatial relation operations. Data manager 210 may also be configured to retrieve datasets for performance of spatial relation operations at computing device 202. For instance, a dataset and/or polygon information may be retrieved from a DB such as DB(s) 116 (or from hosted application(s)/service(s) 106) by data manager 210 and loaded into memory 206 to perform operations by processor 204.

Reduction manager 212 may be configured to reduce data points associated with vertices of polygons. Reductions may be performed by inner-reductions, outer-reductions, and/or combinations thereof. Inner reduction logic 214 may be configured to perform inner-reductions, and outer reduction logic 216 may be configured to perform outer-reductions. Inner-reductions may include the removal of one or more data points associated with an original polygon to generate a modified representation thereof that has an area that is within (e.g., entirely within) the bounds of the original polygon. While an outer-reduction may include the removal of one or more data points associated with the original polygon to generate a modified representation thereof that has an area that encompasses (e.g., the original polygon is entirely within the modified representation) the bounds of the original polygon.

Operation supporter 218 may be configured to perform, support, and/or supplement the execution of spatial relation operations, such as a spatial relation operation being executed by processor 204. Such support and/or supplementation may include monitoring execution and determining when cascade eliminations are to be applied during the operation.

Cost manager 220 may be configured to determine and/or monitor costs associated with spatial relation operations and/or cascades of single side reductions. Such determinations and/or monitoring may be performed with respect to processor 204 and/or with respect to data/information associated with prior spatial relation operations performed. Cost manager 220 may operate in conjunction with operation supporter 218.

Union generator 222 may be configured to perform geometric unions of individual polygons that make up multi-polygons. Unions may be performed by union generator 222 in accordance with requirements for unions as described in further detail below.

Additional details regarding generalization manager 208 and its components are provided below.

A. Example Embodiments for Inner- and Outer-Reductions

Figure 3A:
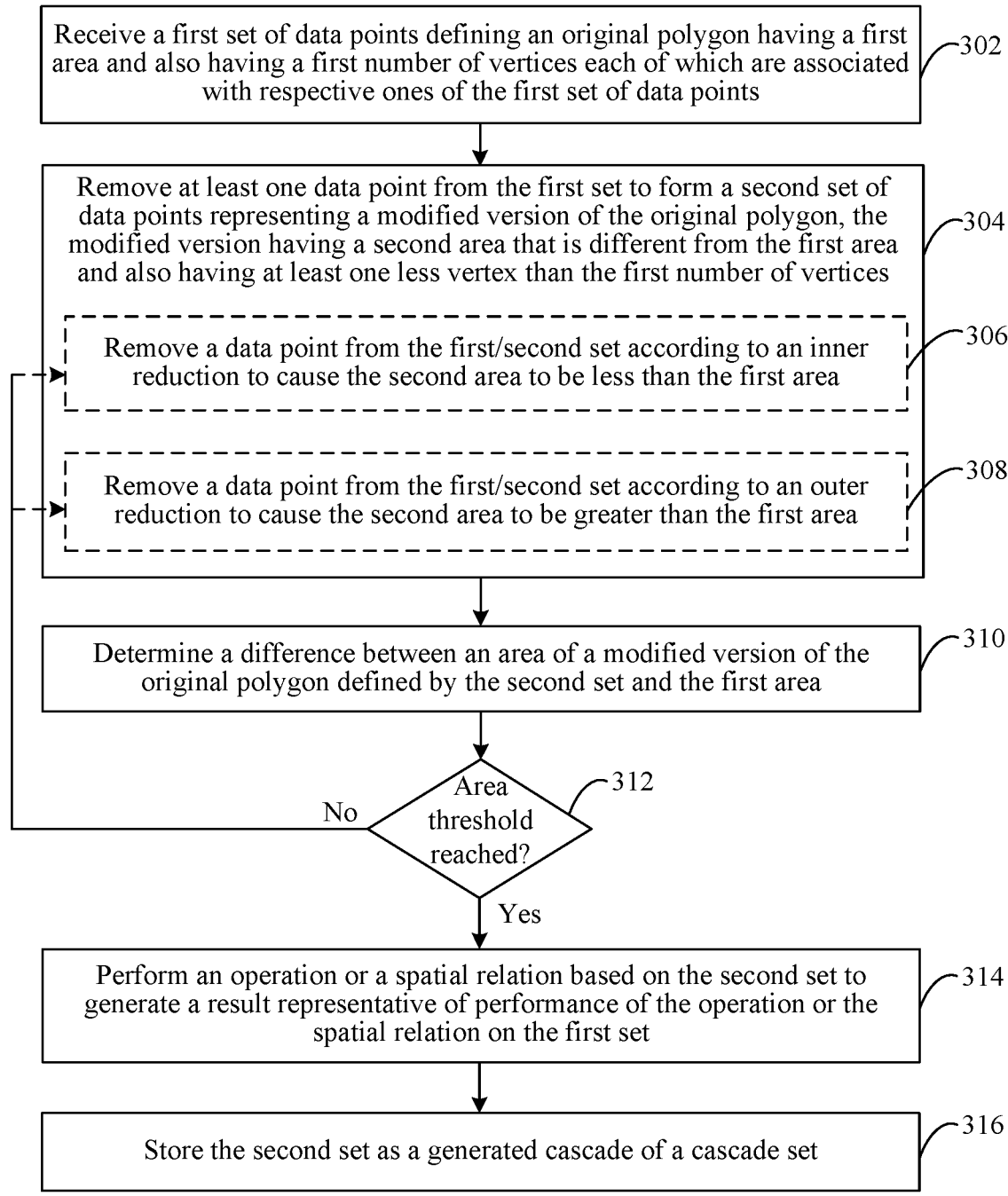
FIG. 3A and FIG. 3B show flowcharts for cascade elimination of candidates in spatial relation operations, according to an example embodiment.
Figure 3B:
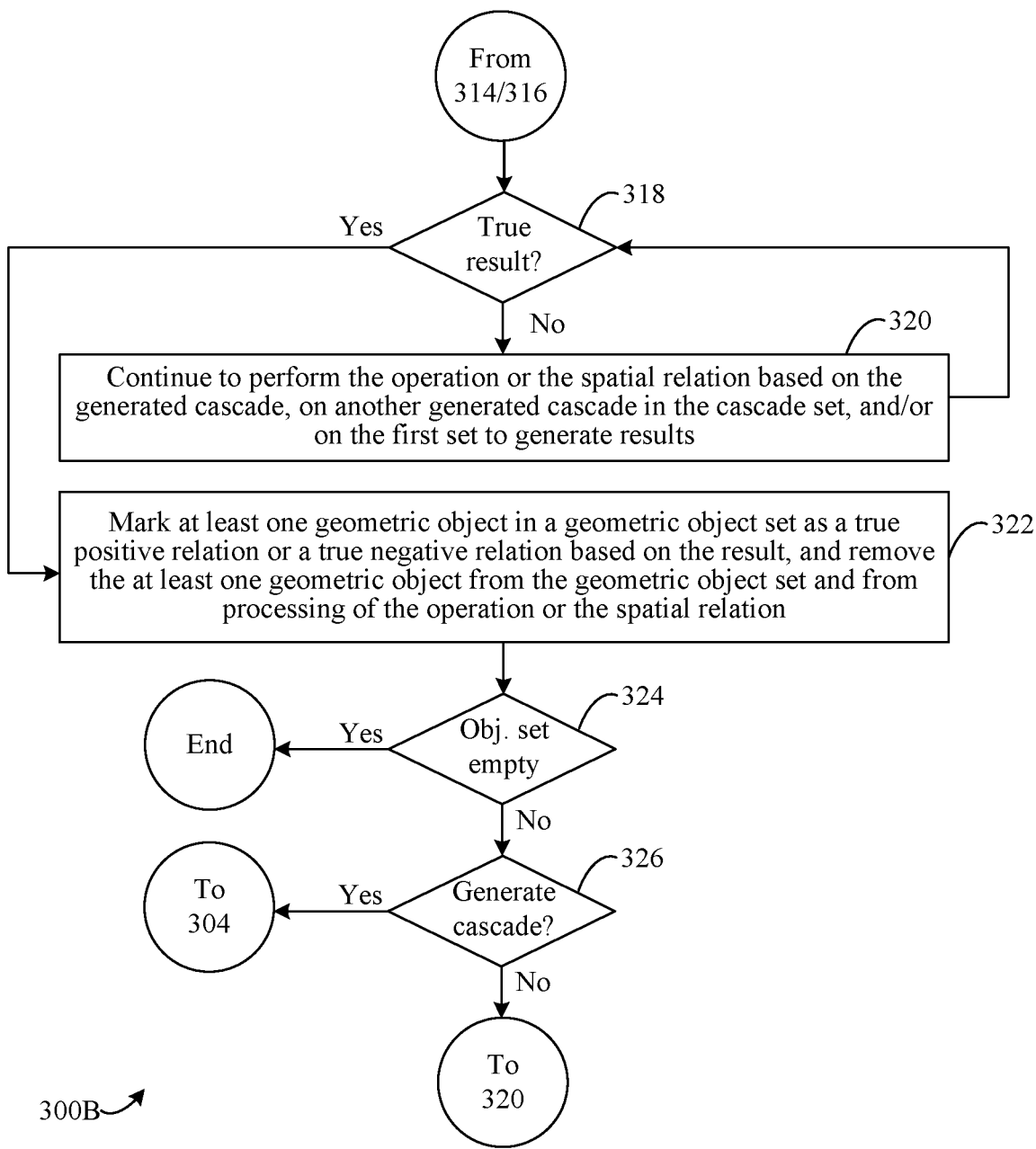
Figure 4A:
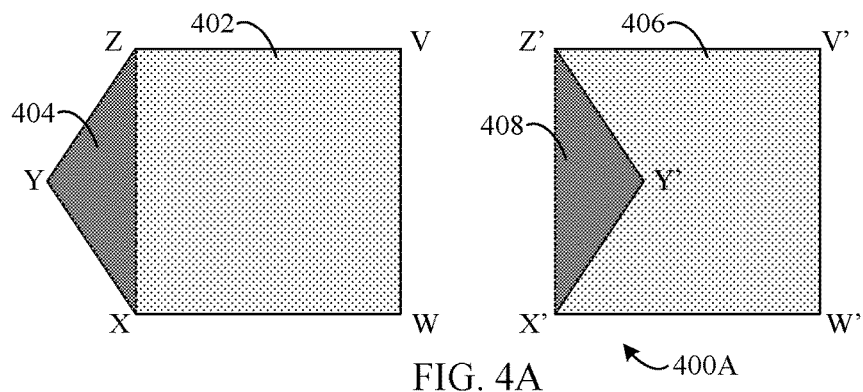
FIG. 4A and FIG. 4B show diagrams of geometries with inner- and outer-reduction criteria, according to example embodiments.
Figure 4B:
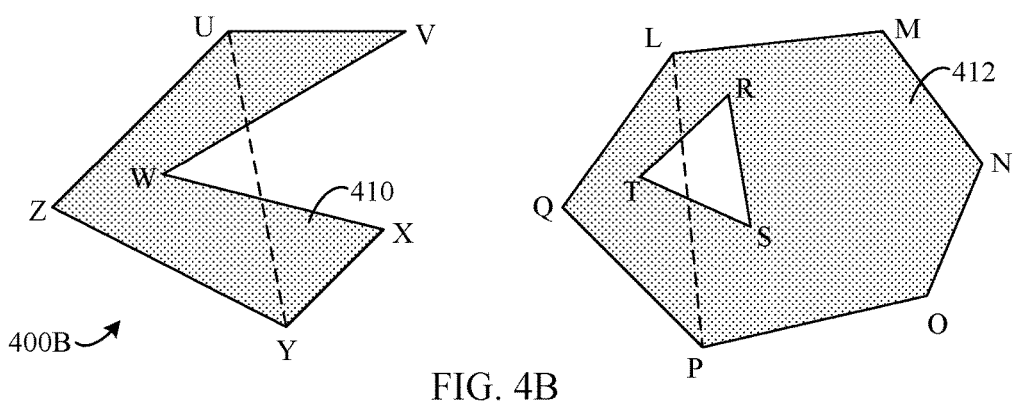
Figure 5A:
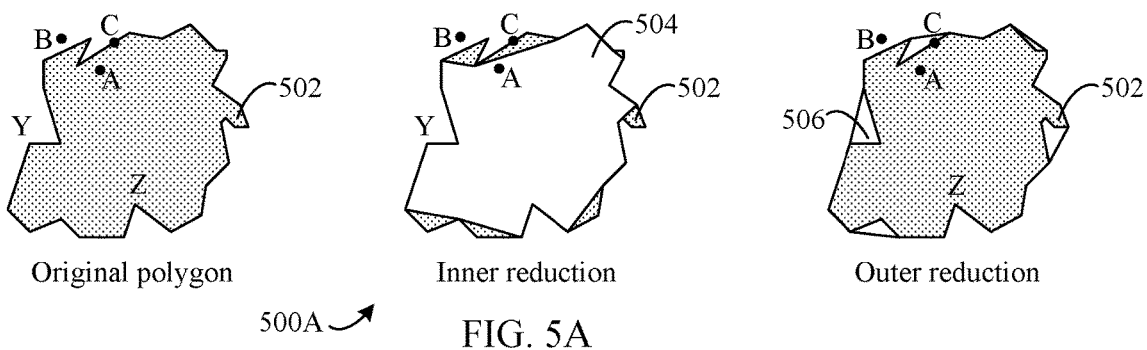
FIG. 5A and FIG. 5B show diagrams of geometric objects spatially relative to geometries using inner- and outer-reductions, according to example embodiments.
Figure 5B:
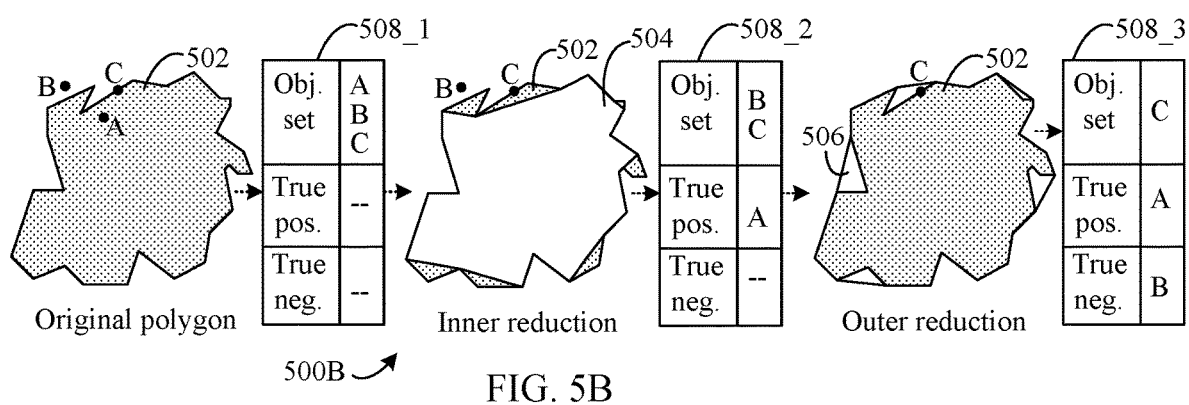

For instance, FIGS. 3A, 3B, 4A, 4B, 5A, and 5B will now be described. FIGS. 3A-3B show a flowchart 300A and a flowchart 300B for cascade elimination of candidates in spatial relation operations, according to an example embodiment. FIGS. 4A-4B show diagrams of geometries 400A and 400B respectively with inner- and outer-reduction criteria, according to example embodiments. FIGS. 5A-5B show diagrams of geometries 500A and 500B having spatially located geometric objects via inner- and outer-reductions, according to example embodiments.

Cascade manager 208 may operate according to flowchart 300A of FIG. 3A and/or flowchart 300B of FIG. 3B. Further structural and operational examples will be apparent to persons skilled in the relevant art(s) based on the following description. Flowchart 300A and flowchart 300B are also described as follows with respect to system 100 of FIG. 1 and system 200 of FIG. 2.

Flowchart 300A begins at step 302. In step 302, a first set of data points defining an original polygon having a first area and also having a first number of vertices each of which are associated with respective ones of the first set of data points is received. For example, data manager 210 of cascade manager 208 may be configured to receive/retrieve sets of data points from a DB such as DB(s) 116 for which data manager 210 has access. The data points may be associated with vertices of a polygon that represents a geometry or geography for which a spatial relation operation is to be performed against geometric objects of interest, i.e., candidates. The data points may be stored in memory 206 for operations carried out by processor 204. In embodiments, geometric objects of interest may also be received/retrieved in step 302, or may be received/retrieved at a different time.

It is also contemplated herein that, while not shown for brevity, spatial relation operations may be performed on one of more geometric objects subsequent to step 302 and prior to step 304 described below.

In step 304, at least one data point is removed from the first set to form a second set of data points representing a modified version of the original polygon, the modified version having a second area that is different from the first area and also having at least one less vertex than the first number of vertices. For instance, reduction manager 212 may be configured to remove one or more data points from the first set to form a second set of data points with fewer data points than the first set. The data points of the second set, because they still correspond to vertices of a polygon, thus represent a modified version of the original polygon where the modified version also has a different area than the original polygon.

Referring now to FIGS. 4A-4B, FIG. 4A shows an example polygon 402 (i.e., a line figure) with vertices VWXYZ and an example polygon 406 with vertices V'W'X'Y'Z'. As noted above, each vertex of an original polygon may correspond to a data point in a dataset that comprises a first set of data points. In this example, the data points for vertices VWXYZ may comprise a first set of polygon 402, and vertices V'W'X'Y'Z' may comprise a first set of polygon 406. Each data point for a vertex may be associated with location information and/or geometry information that is relative to other data points, its polygon, a coordinate system, a map, and/or the like.

For polygon 402 of FIG. 4A, reduction manager 212 may be configured to remove data points associated with the vertices. Each data point/vertex may be processed by reduction manager 212. For example, looking at vertex Y, reduction manager 212 may be configured to determine if the associated data point should be removed based on a triangle formed by the data point in question, along with its preceding and following data points (e.g., corresponding to vertex X and vertex Z in this example)—in other words, three consecutive data points are considered. Thus, a triangle 404 formed by XYZ is considered by reduction manager 212 for this example. Reduction manager 212 may be configured to determine that triangle 404 is a part of an appropriate shape if the orientation of the points XYZ of triangle 404 is the same as the orientation of the line figure (i.e., polygon 402), and vice versa. As shown in FIG. 4A, polygon 402 contains triangle 404. Accordingly, omission of the data point for vertex Y would result in the omission of the entirety of triangle 404, so if an inner reduction is to be performed, the data point for vertex Y may be omitted when the corresponding triangle 404 is a part of the polygon 402. In other words, a data point/vertex can be omitted, i.e., the set is reduced, when its orientation with neighboring data points/vertices, here triangle 404, is the same as the orientation of its line figure, here polygon 402.

However, for polygon 406 of FIG. 4A, reduction manager 212 may be configured to determine that reduction for the data point corresponding to vertex Y' is not to be performed. In polygon 406, the relative position of vertex Y' with respect to polygon 406 is different than vertex Y in polygon 402. Thus, a triangle 408 formed by vertices X'Y'Z' is not included within polygon 406 which is defined by V'W'X'Y'Z', and therefore, reduction manager 212 is configured to determine that an inner reduction of removal of the data point associated with vertex Y' for polygon 406 should not be performed.

For outer reductions, the opposite considerations from inner reductions apply. For example, in the case of polygon 406 noted above, reduction manager 212 is configured to determine that the data point for vertex Y' may be reduced for an outer reduction of polygon 406 based on a consideration of triangle 408. Simply put, removal of vertex Y' would result in a modified, four-sided polygon defined by vertices V'W'X'Z' where the original polygon 406 would be included therein.

However, in some cases, the omission of a vertex/data point according to the above considerations may lead to intersections in the line-figures (e.g., the line boundaries of the polygons) of the same shape which would give non-valid geometries. For instance, FIG. 4B shows a polygon 410 and a polygon 412 that illustrate this issue. Polygon 410 is shown as being defined by vertices UVWXYZ. In making an inner reduction determination for the data point of vertex Z in polygon 410, reduction manager 212 is configured to consider the triangle formed by vertices YZU. As shown, the triangle formed by vertices YZU includes another vertex of polygon 410 (i.e., vertex W), therefore reduction manager 212 is configured to determine that the reduction of the data point for vertex Z would yield a non-valid geometry, and this reduction would not be performed. In contrast, an outer reduction for the data point of vertex W would be determined by reduction manager 212 as being possible and yielding a valid geometry for similar reasons as described above for polygon 406 of FIG. 4A.

For polygon 412 which is defined by vertices LMNOPQRST, where RST form a triangle that not part of the surface (or the area) of polygon 412, reduction manager 212 is configured to determine that the reduction of the data point for vertex Q would yield a non-valid geometry, and this reduction would not be performed. That is, vertex T of polygon 412 is inside the triangle formed by vertices PQL, and thus removal of the data point for vertex Q is not performed. In contrast, an inner reduction for the data points of vertices M, N, O, and/or P would be determined by reduction manager 212 as being possible and yielding a valid geometry for similar reasons as described above for polygon 406 of FIG. 4A.

In other words, if it is true that in the triangle being considered for reduction of a particular data point/vertex, there are no other vertices/data points of the same shape, then the line segment forming the triangle between previous and next vertices/data points, from the point being considered, would not intersect any line figure of the geometry and would not cause a vertex/data point to be within the triangle, thus the resulting geometry post-reduction would remain valid.

Referring again to flowchart 300A of FIG. 3, step 304 may include sub-steps such as step 306 and/or step 308, in embodiments. As noted above, reduction manager 212 may reduce data points using inner- and/or outer-reductions via inner reduction logic 214 and/or outer reduction logic 216, respectively.

In step 306, a data point is removed from the first/second set according to an inner reduction to cause the second area to be less than the first area. For example, inner reduction logic 214 may be configured to remove one or more data points from sets of data points by employing an inner reduction. As noted above, inner reductions generate a modified version of a polygon where the modified version is included within the area of the original polygon.

In step 308, a data point is removed from the first/second set according to an outer reduction to cause the second area to be greater than the first area. For example, outer reduction logic 216 may be configured to remove one or more data points from sets of data points by employing an outer reduction. As noted above, outer reductions generate a modified version of a polygon where the modified version includes the area of the original polygon within the modified version.

Turning to FIG. 5A and geometries 500A, an original polygon 502 is shown having geometric objects A, B, and C. As described herein, spatial relation operations may include determinations of whether objects of interest (e.g., represented here as location points) are within a certain geometry/geography (although other operations may include intersections, contains, etc.). As illustrated, original polygon 502 also includes a vertex Y and a vertex Z described in further detail below. In this example, the operation may be to determine if geometric objects A, B, and C are within, or are without, original polygon 502.

Geometries 500A also include an inner reduction example of original polygon 502. As noted above, inner reduction logic 214 may be configured to remove one or more data points from sets of data points by employing an inner reduction. An inner-reduced polygon 504 is a modified version of original polygon 502 based on an inner reduction. That is, the surface or area of inner-reduced polygon 504 is within the area/surface of original polygon 502, thus the area/surface of inner-reduced polygon 504 is less than original polygon 502. Additionally, as illustrated in FIG. 5, inner-reduced polygon 504 has eight fewer data points/vertices than original polygon 502.

It should be noted that for this example the data point for vertex Y has not been reduced for inner-reduced polygon 504. As noted herein for some embodiments, reduction of data points may be based on areas of triangles corresponding to the vertex in question, e.g., from smaller areas to larger areas. Here, a reduction is not performed for vertex Y as such a reduction would cause the area of inner-reduced polygon 504 to deviate more than is desired from the area of original polygon 502, e.g., based on an area tolerance as described below.

Now looking to an outer reduction polygon 506 in FIG. 5, outer reduction logic 216 may be configured to remove one or more data points from sets of data points by employing an outer reduction to generate outer-reduced polygon 506. Outer reduction polygon 506 is a modified version of original polygon 502 based on an outer reduction. That is, the surface or area of outer-reduced polygon 506 has an area/surface that contains or has within it the area/surface of original polygon 502, thus the area/surface of outer-reduced polygon 506 is greater than original polygon 502. Additionally, as illustrated in FIG. 5, outer-reduced polygon 506 has seven fewer data points/vertices than original polygon 502.

It should also be noted that for this example the data point for vertex Z has not been reduced for outer-reduced polygon 506. As noted herein for some embodiments, reduction of data points may be based on areas of triangles corresponding to the vertex in question, e.g., from smaller areas to larger areas. Here, a reduction is not performed for vertex Z as such a reduction would cause the area of outer-reduced polygon 506 to deviate more than is desired from the area of original polygon 502, e.g., based on an area tolerance as described below.

In step 310, a difference between an area of a modified version of the original polygon defined by the second set and the first area is determined. For instance, reduction manager 212 may be configured to determine a difference between the area/surface of the original polygon and the version of the polygon modified through an inner- or outer-reduction. Reduction manager 212 may be configured to determine the area(s) of the original polygon and/or modified versions thereof, e.g., and inner- and outer-reductions are performed, and determine a difference therebetween which may be compared to a threshold value, e.g., an area tolerance. The threshold value or area tolerance may be predetermined (e.g., as 5%, 10%, 20%, etc.), may be based on the number of vertices, or may be proportional to the area of the original polygon.

In step 312, it is determined if the area threshold is reached. For example, reduction manager 212 may be configured to compare the difference from step 310 and determine if the difference exceeds, meets, or approximately meets the threshold requirement. If so, flowchart 300A proceeds to step 314. If not, flowchart 300A returns to step 304 for performance of one of the sub-steps, i.e., step 306 if data points are being removed according to an inner reduction or step 308 if data points are being removed according to an outer reduction, in which additional data points corresponding to vertices of the original polygon are reduced.

In step 314, an operation or a spatial relation is performed based on the second set to generate a result representative of performance of the operation on the first set. For instance, operation supporter 218 may be configured to perform, initiate, and/or cause execution of the operation or the spatial relation on the second set of data points. The operation/spatial relation may be for an intersection relationship, a within relationship, a contains relationship, etc., or equivalents thereof. Because the second set is a reduced representation of the first set, a modified geometry defined by the second set is a representation of the original geometry, and thus an operational result for the second set is representative of performance of the operation on the first set. Step 314 may include a single side inner reduction and/or a single side outer reduction, in embodiments. In embodiments, the single side inner reduction may be performed first in order to eliminate true-positive geometric objects earlier in the overall operation process. In embodiments, step 314 may be performed for a single geometric object in a geometric object set, or may be performed for remaining geometric objects in the geometric object set.

In step 316, the second set is stored as a generated cascade of a cascade set. For example, reduction manager 212 may be configured to store the generated cascade in memory 206 for later use in processing other geometric objects for the operation against the original polygon. In embodiments, step 316 may be optional. If it is not yet possible to determine a true positive or true negative relationship for a geometric object based on the result from step 314, step 316 may be initially skipped pending further processing using other cascades or the first set of data points.

Flowchart 300B may be a further embodiment of flowchart 300A. In embodiments, flowchart 300B may describe spatial relation operations which process geometric objects individually. Flowchart 300B begins at step 318 which may follow from step 314 and/or step 316 of flowchart 300A.

In step 318, it is determined if a true result of the spatial relation operation for a geometric object is obtained. For instance, as noted herein, geometric objects are determined as true positive or true negative relations for a given operation. In embodiments, operation supporter 218 may be configured to determine if a true result for a processed geometric object is obtained. If so, flowchart 300B proceeds to step 322, and if not, flowchart 300B proceeds to step 320.

In step 320, the operation or the spatial relation is continued to be performed based on the generated cascade, on another generated cascade in the cascade set, and/or on the first set to generate results. For example, operation supporter 218 may be configured as noted in step 314, but in step 320 the operation is continued based on another cascade and/or on the first set of data points for vertices of the original polygon, e.g., original polygon 502. Cascades in the cascade set may be inner- or outer-reductions, and may be based on a tighter area tolerance than previous cascades used for the operation. If no additional cascades are available in the cascade set, the operation may continue based on the first set of data points corresponding to the original polygon, e.g., original polygon 502.

In step 322, at least one geometric object in a geometric object set is marked as a true positive relation or a true negative relation based on the result, and the at least one geometric object is removed from the geometric object set and from processing of the operation or the spatial relation. For example, operation supporter 218 may be configured to mark or otherwise identify geometric objects as true positives and true negatives based on the operation result in step 314 of flowchart 300A and/or step 320. Additionally, operation supporter 218 may be configured to remove geometric objects from the geometric object set on which the operation in step 314 of flowchart 300A and/or step 320 is applied because once a true positive relation or a true negative relation is determined for geometric objects, no further processing thereof is required.

Additionally, only those geometric objects remaining in the geometric object set are determined for true positive/true negative relations with the original polygon in step 320. That is, at a given performance of step 320, geometric objects may have previously been removed from the geometric object set. Therefore, performance of the operation based on the full, first set of data points if performed in step 320, which requires more processing and memory than when the operation is based on a reduced set of data points, is mitigated in that a greatly reduced number of geometric objects are analyzed for the full first set.

Referring also now to FIG. 5B and geometries 500B with respect to step 314 of flowchart 300A, and step 320 and step 322 above, polygon 502, the original polygon, is again shown along with inner reduced polygon 504, outer reduced polygon 506, and geometric objects A, B, and C, as illustrated for geometries 500A of FIG. 5A. A status table 508, which may be stored in memory 206 of system 200, is also illustrated in FIG. 5B (although other types of data structures stored in memory are also contemplated herein). Status table 508 describes three different statuses for the geometric object set (e.g., '_1', '_2','_3') as a single side cascade is performed. Thus, as noted in a status table 508_1, a geometric object set includes geometric objects A, B, and C, while designations of true positive relations and true negative relations have not yet been determined in step 314.

In this example, as continuing from flowchart 300A, an inner reduction is performed first in the cascade (e.g., according to step 304, step 306, and step 310), as depicted by inner reduced polygon 504 of FIG. 5B. Because inner-reduced polygon 504 is within or contained by original polygon 502, a true positive determination for geometric object A being within or contained by original polygon 502 can be made, and geometric object A may be removed from further processing for the operation. And, because the number of data points has been reduced, fewer processing cycles are required to make such a determination. However, neither a true positive nor a true negative determination can be made for geometric object B and geometric object C based on inner-reduced polygon 504. Therefore, the status of the geometric object set is updated for the status table, as shown in status table 508_2. Status table 508_2 shows that geometric object A has been removed from the geometric object set being processed according to the operation and designated as a true positive result, in accordance with step 318 and step 322.

In embodiments, it is also contemplated that geometric object A may be fully processed according to the spatial relation operation prior to making determinations for geometric object B and geometric object C. It is also contemplated that any single side reductions generated for the processing of geometric object A may be stored for reuse in later processing of other geometric objects. For instance, after the processing of geometric object A, inner-reduced polygon 504 may be applied with respect to geometric object B (e.g., where geometric object B is the next geometric object in the geometric object set).

Subsequent to step 322, it is determined in step 324 if the geometric object set is empty. For instance, operation supporter 218 may make a determination as to whether each geometric object in the set has been processed for the spatial relation operation. If so, flowchart 300B ends, but if not, flowchart 300B proceeds to step 326.

It is determined in step 326 if additional cascades are to be generated. For example, cost manager 220 may be configured to determine if additional cascades are to be generated based on one or more cost models, described in further detail below. If not, flowchart 300B returns to step 320 where in a next iteration for a next geometric object, the same generated cascade may be used, another generated cascade may be used, or the first set may be used. If so, flowchart 300B proceeds to step 304 of flowchart 300A for performance of additional ones, or the other one(s), of the inner reduction or the outer reduction.

In the current example continuing from flowchart 300A, the operation has only been performed based on an inner reduction or cascade, and generation of a new cascade is determined in step 326, so the description continues here with performing the operation on a newly generated outer reduction or cascade via step 304 of flowchart 300A.

The outer reduction performed for this example cascade (e.g., according to step 304, step 308, and step 310), is depicted by outer reduced polygon 506 of FIG. 5B. Because outer-reduced polygon 506 contains or has within it original polygon 502, a true negative determination for geometric object B being within or contained by original polygon 502 can be made. That is, a positive result of geometric object B being outside of original polygon 502 is determined. And because the number of data points has been reduced, fewer processing cycles are required to make such a determination. However, neither a true positive nor a true negative determination can be made for geometric object C based on outer-reduced polygon 506. No determinations for geometric object A are attempted for the operation because geometric object A was already marked completed for the spatial relation operation and removed from further analysis. Therefore, the status of the geometric object set is updated for the status table, as shown in status table 508_3. Status table 508_3 now shows that geometric object B has also been removed from the geometric object set being processed according to the operation, as in step 322, but geometric object B is designated as a true negative result, in accordance with step 314 and step 318, while geometric object A remains designated as true positive.

In an embodiment where a cascade for outer-reduced polygon 506 was previously generated and included in the cascade set, flowchart 300B may return to step 320 where the performance of the operation is continued based on the cascade for outer-reduced polygon 506. Likewise, if no cascades are determined to be generated in step 326, and the cascade for outer-reduced polygon 506 has not been generated previously, flowchart 300B may return to step 320 where the performance of the operation is continued based on the first set corresponding to original polygon 502.

Thus, only geometric object C remains active in the geometric object set to be determined for a true positive or a true negative relation with respect to original polygon 502 for the operation in this example.

In other words, the embodiments herein allow for analyzing a larger number of objects of interest based on a less processor-/memory-intensive second set of data points, while only requiring analyzing a smaller number of the objects based on a more processor-/memory-intensive first set of data points.

It should also be noted that flowchart 300A and flowchart 300B are applicable to different embodiments described herein. For instance, flowchart 300A and flowchart 300B may describe embodiments for performing spatial relation operations including cascades on a per-geometric object basis, as well as embodiments for performing spatial relation operations including cascades for more than one geometric object at a time.

Figure 6:
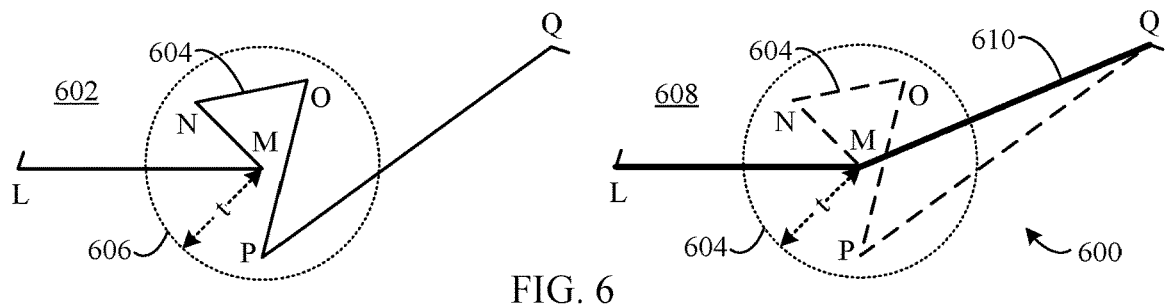
FIG. 6 shows a diagram of a polygon illustrating proximity reductions for cascade elimination of candidates in spatial relation operations, according to an example embodiment.

FIG. 6 shows a diagram of a polygon for proximity reductions 600 for cascade elimination of candidates in spatial relation operations, according to an example embodiment. Reduction manager 212 may be configured to perform proximity reductions as illustrated in FIG. 6. Proximity reductions, as exemplarily illustrated for proximity reductions 600, may be performed before, during, and/or after single side reductions (e.g., inner-/outer-reductions) as described herein. Proximity reductions 600 may be an embodiment of flowchart 300 of FIG. 3.

For example, proximity reductions 600 include a determination 602. Determination 602 is performed with respect to a portion of a perimeter of a polygon 604. The portion of the perimeter of polygon 604 is illustrated as being defined by data points corresponding to vertices LMNOPQ, where these vertices are part of a first set. As, before, or after, a single side reduction is performed by reduction manager 212 for polygon 604 at vertex M, from vertex L, determination 602 may be performed with respect to a proximity tolerance 't' shown as area 606 having a radius 't'. As vertex M and its corresponding data point are processed via reduction manager 212, it may be determined by reduction manager 212 whether any other data points/vertices of polygon 604 are within the proximity tolerance area 606 with respect to vertex M.

For instance, reduction manager 212 may be configured to analyze subsequent data points/vertices of vertex M for polygon 604, e.g., vertices N, O, P, Q, to determine if any of these subsequent vertices are within the proximity tolerance range T. If so, reduction manager 212 may reduce the data points corresponding to any such vertices and remove them from the first set. As shown in determination 602, vertices N, O, and P are within the proximity tolerance range area 604 defined by proximity tolerance value T, while vertex Q is outside of area 604. That is, for a given data point/vertex, determination 602 may be repeated until a distance of another vertex from vertex M is found that is greater than 't'. Accordingly, vertices N, O, and P may be removed from the first set through proximity reduction, while vertex Q is not reduced. It should also be noted here that the distance between vertex M and its previous vertex L is greater than the indicated proximity tolerance 't', so the data point for vertex M is not reduced.

A proximity reduction 608 is also shown in proximity reductions 600. Thus, a modified version 610 of polygon 604 is generated whose perimeter portion is now defined by vertices LMQ. Data points corresponding to vertices LMQ are included in a second set on which a spatial relation operation may be performed, as described herein.

In other words, embodiments herein provide for the ability to avoid unnecessary calculations for negligibly small segments between vertices, and negligibly small segments may be determined based on the proximity tolerance 't'. This reduces the required processing cycles and memory required for operations on the second set. The value for proximity tolerance 't' may be predetermined, or may be based on the number of data points/vertices of a geometry, the area of a geometry, etc.

Area tolerances may also be implemented for inner-/outer-reductions of cascades. According to embodiments, one or more cascades may be performed before or during the execution of a spatial relation operation. However, because true positive/true negative determinations are made for geometric objects for the spatial relation in a first cascade, and because the geometric object set may be fixed for an execution of a given spatial relation operation, identical cascades may not be subsequently performed. Instead, subsequent cascades may be performed with a tighter area tolerance (with respect to the original geometry) than the prior cascades. Accordingly, next cascades iterate from coarse to fine granularity with respect to the original geometry and prior cascades.

Figure 7:
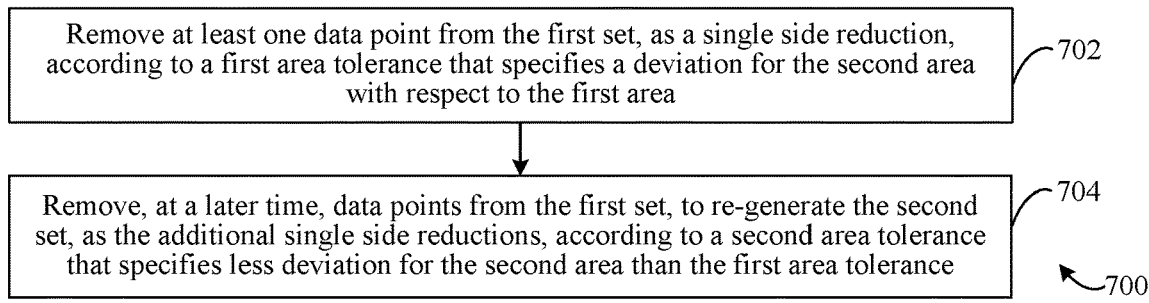
FIG. 7 shows a flowchart for cascade elimination of candidates in spatial relation operations, according to an example embodiment.

Now referring to FIG. 7, a flowchart 700 for cascade elimination of candidates in spatial relation operations is shown, according to an example embodiment. Cascade manager 208 may operate according to flowchart 700 of FIG. 7, which may be an embodiment of flowchart 300 of FIG. 3. Further structural and operational examples will be apparent to persons skilled in the relevant art(s) based on the following description. Flowchart 300 is also described as follows with respect to system 200 of FIG. 2 and geometries 500A of FIG. 5A.

Flowchart 700 begins at step 702. In step 702, at least one data point is removed from the first set, as a single side reduction, according to a first area tolerance that specifies a deviation for the second area with respect to the first area. For instance, reduction manager 212 may be configured to remove data points from a first set as described above in step 304, step 306, and step 308 of flowchart 300. Also, as described in step 310 and step 312, a threshold value or area tolerance may be implemented for single side reductions such that the area of a reduced geometry remains within a certain amount of the area of the original geometry (e.g., as 5%, 10%, 20%, etc.). The area tolerance may be predetermined, may be based on the number of vertices, or may be proportional to the area of the original polygon. In embodiments, for example, a first cascade may implement a relatively higher area tolerance such as 20% in order to generate a more simplified modification of the original geometry that has fewer vertices.

As illustrated in FIG. 5A for geometries 500A, inner-reduced polygon 504 and outer-reduced polygon 506 are formed without reducing vertex Y and vertex Z, respectively, based on an area tolerance or threshold. Thus, even for a coarse reduction, e.g., had a higher percentage for the area tolerance, only a certain number of vertices may be removed from an original geometry.

In step 704, data points are removed at a later time from the first set to re-generate the second set, as an additional single side reduction, according to a second area tolerance that specifies less deviation for the second area than the first area tolerance. For example, reduction manager 212 may be configured to remove data points from the first set at a later time, as described above in step 304, step 306, and step 308 of flowchart 300, such as after the first cascade and associated operation execution, and/or as well as after performing the operation on the first set of data points subsequent to a prior cascade. For step 704, an additional single side reduction for part of a later cascade may include implementation of a threshold value or area tolerance be such that the area of a next reduced geometry remains within a closer amount of the area of the original geometry than the reduced geometry for a prior cascade. That is, in this example the first area tolerance for the reduction in step 702 is 20%, therefore the second tolerance will be lower, e.g., 5%, 10%, or 15%. In other words, later cascades may implement a relatively lower, finer area tolerance to generate a modification of the original geometry that more resembles the original geometry in order to determine true positive/true negative results for geometric objects that could not be determined with the higher area tolerance in the prior cascade.

Subsequently, further additional cascades will have still finer, more precise area tolerances. Cascade iterations for elimination of candidate geometric objects is discussed in additional detail with respect to cost models in the subsection below.

B. Example Embodiments for Cost Models

In embodiments, cost models may be implemented for determining when cascades are performed. Operational calculations with a cascade are, due to a smaller number of data points/vertices, several times faster than calculations with the an original geometry—that is, operations require fewer processing cycles with inner-/outer-reductions. That is, as noted herein, a large number of geometric objects can be determined as true positive/true negative for relationships with geometries based on those geometries having smaller numbers of vertices. In embodiments, a single sided inner reduction is first utilized to determine true positives, then a single sided outer reduction is utilized to determine true negatives, thus completing an inner-/outer-cascade prior to processing indeterminate ones of the geometric objects against the original geometry.

In general, more than one inner-/outer-cascade can be added to the overall processing, with different precision and point reduction in each cascade, where, less precise cascades (i.e., those with less points) would be applied first.

However, calculating one cascade requires time proportional to the time needed to calculate the spatial relation operation, which can slow down the entire query and use additional computing cycles. For example, if a number of iterations ('n') is large enough, the time saved by using cascades would have exceeded the time spent on calculating the cascades, and therefore the whole query would be accelerated overall. Yet, if 'n' is small, situations may arise in which the cascades are calculated and used only once, which would likely slow down the query and prolong processing. Because the intrinsic execution for the operation may be part of a complex pipeline, 'n' may be unknown in advance (e.g., in stream processing, where geometric objects are added to the geometric object set during performance of the operation, etc.). Accordingly, embodiments herein utilize the heuristics described below to determine whether and when to calculate and utilize the cascades.

As an example, a 'contains' operation has multiple paths (or optimizations) which can calculate the relationship of two geometries (e.g., is a geographic object contained in an original geometry). The processing requirements and time for all these paths may be measured in practice, and based on the measurements, functions for estimating the cost of each path are created as cost models. The costs may be summed into one variable that represents the total cost of the calculations in the spatial intrinsic operation, which may be referred to as the original cost. Functions for estimating the cost of calculating cascades may also be created.

Figure 8:
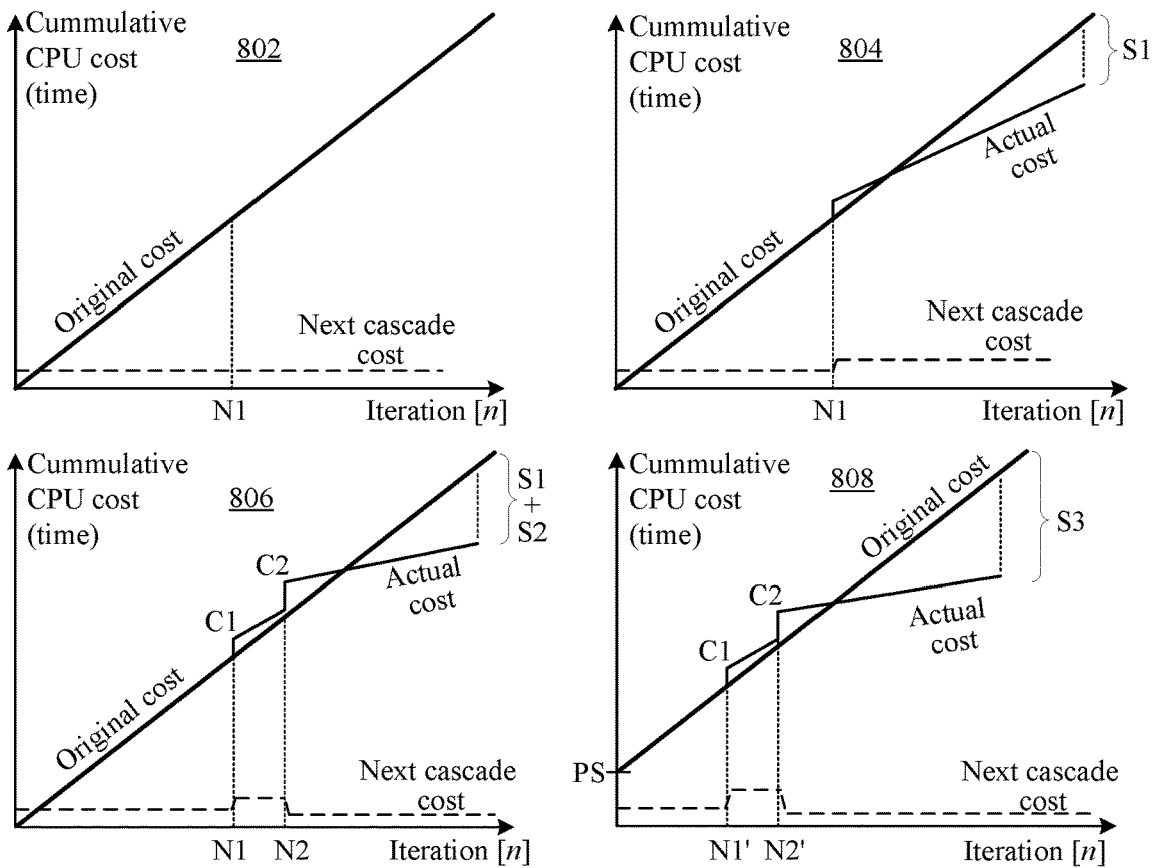
FIG. 8 shows plots of representations for cost models for cascade elimination of candidates in spatial relation operations are shown, according to example embodiments.

Turning now to FIG. 8, plots of representations for cost models 800 for cascade elimination of candidates in spatial relation operations are shown, according to an example embodiment.

Cost models 800 include a first cost model 802 that illustrates the original cost, exemplarily shown as required processing, over time when there are no cascades implemented. Also illustrated in model 802 is a cost of calculating a first cascade C1 for the original geometry. It can be seen that over time, the cost of the first cascade C1 becomes relatively small, or negligible, in relation to the original cost of the intrinsic calculations. For instance, at a moment of time where a next geometric object N1 is processed for a spatial relation operation, the cost of the first cascade C1 cost becomes approximately 5% of the original cost, and the first cascade C1 may be implemented, as described herein, at this moment before the processing of N1. Although this new cascade will be used, the original cost may still be counted as if the original geometry only is being utilized, so the original cost graph will not change.

A second cost model 804 is also shown in cost models 800. The original cost from model 802 is shown in model 804, as is the time to process N1 where the first cascade C1 will be performed. Additionally, a separate cost calculation is determined taking into account all the calculations that actually occur for implementation of the first cascade C1 (including performing the spatial intrinsic operation thereon) as well subsequent operation execution for the remaining geometric objects against the original geometry. This is referred to herein as the 'actual cost' of calculations in intrinsic.

Up to the moment for processing N1 and adding the first cascade C1, the original cost and the actual cost will be identical, because there are no cascades implemented. From the moment of adding the first cascade C1 before processing N1, the actual cost of the calculation will differ from the original cost. And as not all cascades have the same calculation cost, at the time for processing N1 and for adding the first cascade C1, a new cost (herein, the cost of calculating second cascade) is set to the next cascade cost.

Because the actual cost also includes the cost of all the calculated cascades, this will make the actual cost graph higher than the original cost graph beginning at the moment for processing N1 least until a future time at which the efficiency benefit of the first cascade C1 has reduced the actual cost by 5%. That is, the difference between the actual cost and the original cost is the slow-down of the query and performance of the operation, and at the time for processing N1 and for adding the first cascade C1, the difference will be 5%. If the first cascade C1 is added just before the nth geometric object is analyzed, the query is slowed down, but only by a maximum of 5%. If there are additional geometric objects left in the geometric object set for calculating, and it is expected that calculating with a cascade is faster than calculating without performing a cascade, the actual cost should quickly go below the original cost. For instance, as shown in model 804, the actual cost becomes less than the original cost after an interval of time subsequent to processing N1 and would result in an overall cost savings Si at the end of the query operation and a faster completion time.

A third cost model 806 is also shown in cost models 800, where model 806 continues from model 804 and a second cascade C2 is performed. In embodiments, the next time at which a next cascade cost, here a time just prior to processing geometric object N2 for cascade C2, is added to the actual cost is such that the addition of the next cascade cost will not cause a difference between the new actual cost and the original cost that is greater than 5% of the original cost. At such a time, e.g., for processing N2 for model 806, second cascade C2 is added. In a similar manner, further cascades may be added, according to embodiments.

As illustrated in model 806, after a time interval subsequent to cascade C2 being added for processing N2, the actual cost, which is now based on cascade C1 and cascade C2 making the overall operation more efficient, becomes less than the original cost. Additionally, the slope of the plot for the actual cost flattens out and less processing is used per unit time. Again, if there are additional geometric objects left in the geometric object set for calculating, and it is expected that calculating with a cascade is faster than calculating without performing a cascade, the actual cost quickly goes below the original cost. For instance, as shown in model 806, the actual cost becomes less than the original cost after the subsequent time interval and results in both an overall cost savings S1+S2 at the end of the query operation and a faster completion time.

As illustrated in model 804 and model 806, the actual cost never exceeds the original cost by more than 5%, which limits the regression of the entire query (taking into account that these costs are calculated only for calculations in the spatial intrinsic part of the query operation—in the worst case, the regression in the entire query is even lower).

A fourth cost model 808 is also shown for cost models 800. Model 808 illustrates embodiments for queries with nested loops for operations to count relations between a geometry and geometrics objects of interest. For instance, a nested loop may comprise 'm' by 'n' loops where there are 'm' outer iterations and 'n' inner iterations, and cascades are calculated for the outer loop geometries. For each outer loop iteration, a set of new cascades may be calculated, so costs described herein may be reset at the beginning of each outer loop iteration. When the number of iterations of the inner loop is known, cascades may be added to the overall operation process earlier and thus further increase the query acceleration for a larger cost savings S3.

In embodiments, the costs of a current iteration are shown in model 808. At the end of a prior loop iteration, the amount saved in cost by using cascades can be calculated as a difference between the original cost and the actual cost. If a part of that savings (shown as 'PS' in model 808 which may be approximately 20% as illustrated) is added to the actual cost and the original cost of the next iteration, the point in time at which processing for geometric object N1' occurs in model 808 for calculating the first cascade would be earlier than when processing of N1 occurs in the previous models (e.g., for model 806), and thus subsequent times for next cascades such as prior to processing N2' of model 808 are also earlier than for time in model 806, and additionally, the actual cost falls below the original cost earlier in time for model 808 than the time in model 806. Accordingly, the early addition of cascades in the next iteration "forced," potentially sacrificing the part of the savings achieved in the previous cascade. However, as this is done for each iteration of the outer loop, cascades will be added earlier in time, and thus the cost savings at the end of each iteration will be increased. If an outer loop iteration is of a short duration, or fi there are many geometric objects near the borders/perimeters of reductions, such that cascades are less useful, the savings may be relatively small. In such cases, the next iteration may be provided with no savings offset from the previous iteration, which may delay the adding of the cascades in the next iteration. Also, when outer loop iteration has a negative savings value, the entire negative value of this savings may be transferred to the next iteration, which will additionally delay the adding of subsequent cascades. In this way, previously achieved savings are protected.

In the embodiments shown for model 808, there are a total of two cascades, one inner and one outer, which are applied alternately, inner-outer- ( . . . etc. for additional cascaded). Reduce factors for calculating these cascades may be predefined or may be dynamically determined. The heuristics for embodiments herein are also configured to count the results of intrinsics/relation operations, thus if all the results of a contains or within intrinsic are true positive, reduction manager 212 of FIG. 2 is configured to only add inner cascades, as outer cascades would not benefit the operation in such a case. If after that, true-negative results are determined, outer cascades may be added by reduction manager 212, and the order of using the four cascades may be implemented as inner-outer-inner-outer rather than the order in which the cascades were added.

C. Example Embodiments for Multi-polygon Geometries and Unions

As noted herein, in embodiments, a single geometry may be made up of two or more polygons, that do not overlap in their areas, each of which is defined and bounded by line-figures that connect at vertices. Such geometries are referred to as multi-polygons.

Figure 9:
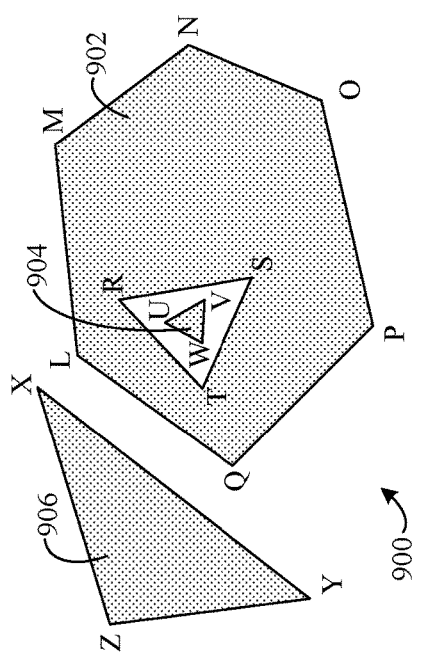
FIG. 9 shows a diagram of a multi-polygon, according to an example embodiment.

FIG. 9 shows a diagram of a multi-polygon 900, according to an example embodiment. Multi-polygon 900 is exemplarily illustrated as a single geometry comprising three different polygons: a polygon 902, a polygon 904, and a polygon 906. Polygon 902 is shown as being defined by vertices LMNOPQRST, or more specifically, polygon 902 is defined as the surface or area with an outer boundary of line-figures connecting vertices LMNOPQ and an inner boundary of line-figures connecting vertices RST. Polygon 904 is defined by line-figures connecting vertices UVW, and polygon 906 is defined by line-figures connecting vertices XYZ. It should be noted that the surfaces, or areas, of polygon 902, polygon 904, and polygon 906 do not overlap or intersect with each other in any way.

For embodiments herein, a multi-polygon may have a union performed on its individual, or sub-, polygons. Unions may be performed by union generator 222 of system 200 in FIG. 2, and may be performed after single side reductions described herein.

Figure 10:
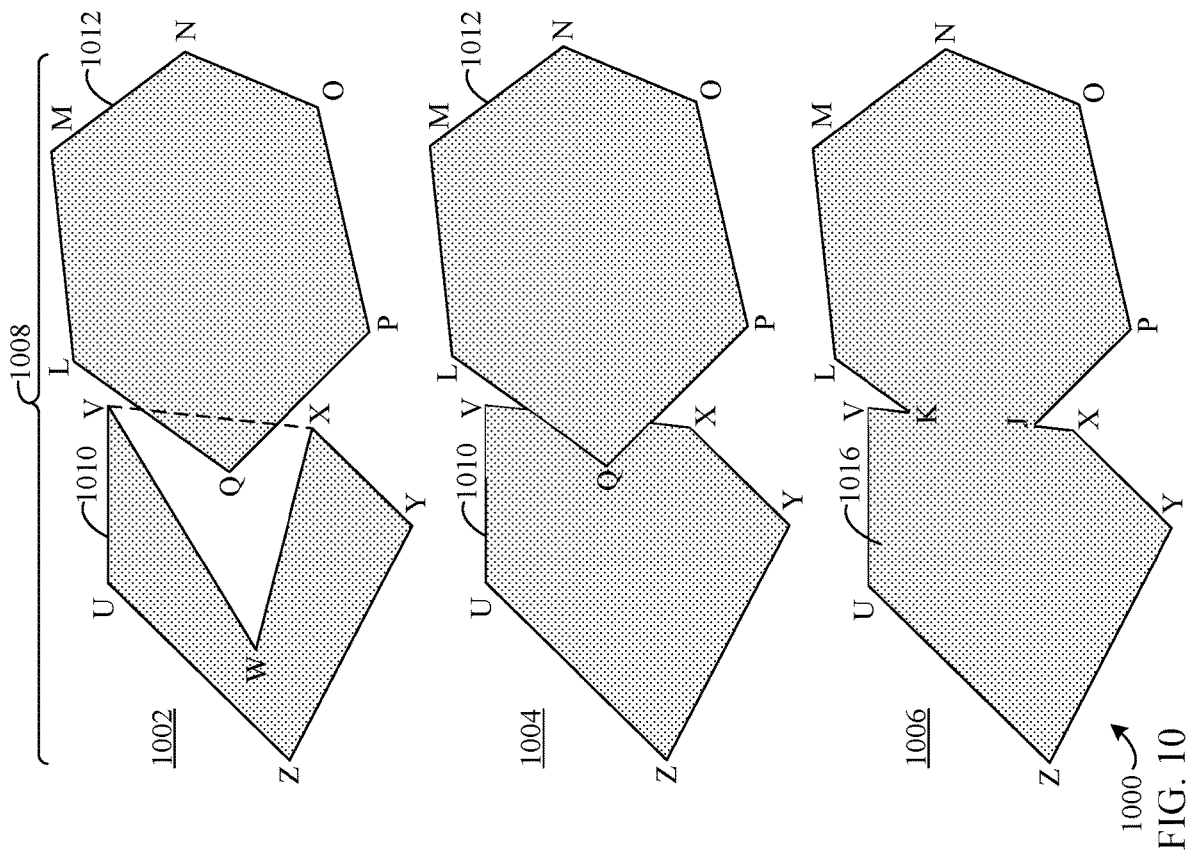
FIG. 10 shows diagrams of a multi-polygon union, according to an example embodiment.

FIG. 10 shows diagrams of a multi-polygon union 1000, according to an example embodiment. Union generator 222 may be configured to perform unions such as multi-polygon union 1000. Multi-polygon union 1000 may be a further embodiment of flowchart 300 of FIG. 3. Multi-polygon union 1000 shows three exemplary union phases: a phase 1002, a phase 1004, and a phase 1006, which are described in further detail as follows.

Phase 1002 shows a multi-polygon 1008 comprised of two sub-polygons, a sub-polygon 1010 defined by vertices UVWXYZ, and a sub-polygon 1012 defined by vertices LMNOPQ. In the context of flowchart 300, multi-polygon 1008 is the original geometry and is a multi-polygon geometry that includes (a first) sub-polygon 1010 defined by a third set of data points for vertices UVWXYZ and having a first sub-area of the first area of the original geometry, and (a second) sub-polygon 1012 defined by a fourth set of data points for vertices LMNOPQ and having a second sub-area of the first area. In this example, the third set of data points and the fourth set of data points are included in the first set of data points, as sub-polygon 1010 and sub-polygon 1012 form the single geometry of multi-polygon 1008. The first sub-area (i.e., the area of sub-polygon 1010) and the second sub-area (i.e., the area of sub-polygon 1012) are separate, non-overlapping areas.

In embodiments, a union may be performed by union generator 222 during or after an outer reduction performed by reduction manager 212 in order to form a valid geometry without overlaps of sub-polygons. This may make a single side reduce operation more expensive, and so in embodiments a union may be called only if it is necessary. For example, in cases of multi-polygons, when an inner reduction is performed, the obtained polygons will be within the original ones, thus it is guaranteed that they will not have area overlaps. In such cases, there is no need for a union. On the other hand, a valid GeometryCollection may have overlaps with themselves, so in this case, a union is necessary for both inner- and outer-reductions. Accordingly, a union may be performed for cases with geometries of the type GeometryCollection, and for cases of geometries which are composed of several shapes where an outer reduction is performed.

As shown, reduction manager 212 may be configured to form a triangle based on a data point for vertex W, along with data points corresponding to the preceding neighbor data point for vertex V and the following neighbor data point for vertex X (shown by the dashed line between vertices V and X). Reduction manager 212 may be configured to remove the data point (for vertex W) from the third set of data points to form a fifth set of data points representing a modified version of (the first) sub-polygon 1010 that has a third sub-area defined by vertices UVXYZ that overlaps with the second sub-area of sub-polygon 1012. This is illustrated in phase 1004.

It should be noted that cases may arise where non-surface portions that are outside of the area of the triangle formed by vertices VWX may be otherwise encapsulated by sub-polygons prior, or subsequent, to the outer reduction illustratively described in phase 1002. For instance, an inner boundary or an encapsulated area formed by the line between vertices V and X and by line-figures connecting vertices in a sub-polygon different from sub-polygon 1012 may comprise an intermediate area. Such encapsulated portions may exemplarily comprise an intermediate area 1014, according to embodiments, while in other embodiments, an intermediate area may be an area of zero. That is, scenarios for embodiments herein contemplate zero or more square units for an intermediate area based on the multi-polygon in question.

Union generator 222 may thus be configured to form a union 1016 of multi-polygon 1008 as a third sub-polygon having an area that includes the second sub-area of sub-polygon 1012, the third sub-area of the modified sub-polygon UVXYZ, and an intermediate area—that is, union 1016 of the modified version of the first sub-polygon and the second sub-polygon as shown in phase 1006.

The vertices of union 1016, i.e., LMNOPJXYZUVK, may be provided by union generator 222 to, or acquired by, reduction manager 212 which is configured to generate the second set of data points accordingly. In other words, excluding data points of the fourth set or the fifth set within the third sub-area (e.g., for vertex Q), including other data points of the fourth set and the fifth set that are part of a perimeter of the third sub-polygon (e.g., for vertices LMNOPXYZUV), and including at least two new data points (e.g., for vertices J and K) corresponding to intersection points of a perimeter of the first sub-polygon and a perimeter of the second sub-polygon.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including without limitation system 100 of FIG. 1, system 200 of FIG. 2, proximity reductions 600 of FIG. 6, cost models 800 of FIG. 8, along with any components and/or subcomponents thereof, as well as any flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC), etc. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 11:
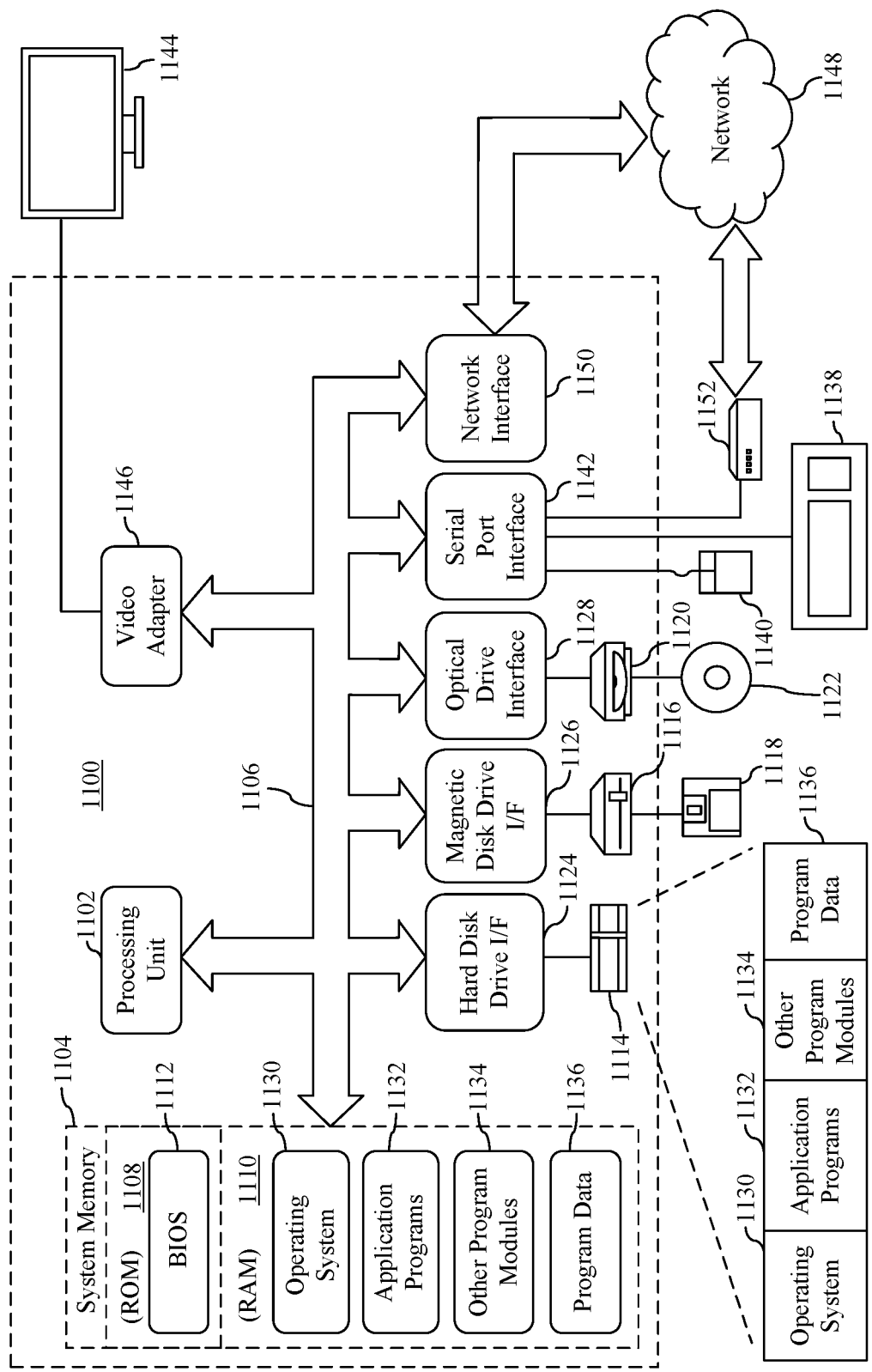
FIG. 11 shows a block diagram of an example computing device that may be used to implement embodiments.

FIG. 11 depicts an exemplary implementation of a computing device 1100 in which embodiments may be implemented. For example, embodiments described herein may be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems and/or game consoles, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing embodiments described herein, such as but not limited to, system 100 of FIG. 1, system 200 of FIG. 2, proximity reductions 600 of FIG. 6, cost models 800 of FIG. 8, along with any components and/or subcomponents thereof, as well as the flowcharts/flow diagrams described herein, including portions thereof, and/or further examples described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

The described embodiments provide for more efficient, and less processing/memory resource intensive, spatial relation operations via cascade elimination of candidates. As example herein note, large numbers of candidate geometric objects are processed for operations to determine true positive/true negative relations based on modified version of geometries defined by fewer data points (e.g., via single side reductions). That is, spatial relation operation costs correspond directly with the number of data points for vertices of original geometries, where more data points require additional processing resources. The embodiments herein correctly identify relations and eliminate candidates based on faster and cheaper operations over fewer data points, and thus a smaller body of candidates are processed for the operation based on the original geometry that more data points. Accordingly, memory and processor requirements are reduced for performing operations for a given dataset. The described cost models and heuristics provide for further resource savings. Still further, as sizes of datasets increase (e.g., for datasets of big data stores), and as original geometries become more complex (e.g., have greater numbers of data points), the reduction in processing requirements and the speed of completion for spatial relation operations are even further improved.

Moreover, the described embodiments do not exist in software or hardware implementations for spatial relation operations. Conventional solutions lack the ability to perform single side reductions in cascades for elimination of true positive/true negative candidates from further processing.

Embodiments may utilize a new simple buffer function that receives a distance argument, e.g., such as a tolerance value, and produces a positive and a negative buffer around a line-figure. One advantage of this simple buffer technique is that it provides for simpler figures with less points and requires less processing resources (is faster). With respect to the number of data points of an obtained geometry, the simple buffer provides a simple resultant geometry, without curved or rounded edges, that includes approximately the same number of data points as the initial geometry. The realized improvement in speed and resource usages may be based on geometries with less precision but that can achieve workable results nonetheless. In embodiments, such buffering may be utilized to mitigate or eliminate problems of accuracy with floating values describing data points, and the simple buffer may extend to a narrow area along the boundary of a triangle, as described herein for reductions, that is comprised of line-figures. Accordingly, in embodiments, a triangle may be omitted when the area, after buffering the triangle by some small tolerance value, does not contain other points of the same geometry.

It is also contemplated herein that while some embodiments may be described in association with certain database server implementations, the embodiments described are applicable to, and may be adapted to, any type of database server regardless of syntax or implementation-specific details thereof.

Embodiments may utilize custom rules that determine operation results in specific situations. Examples of such custom rules, in the non-exclusive/non-exhaustive list below, may be checked in the order in which they are described. For example, if an input geometry is not valid, a single side reduction may throw an appropriate error requiring correction of the geometry. If an input geometry includes curves, a single side reduction may return a NULL geometry. If a specified relative area delta is less than −1, a single side reduction may throw appropriate error requiring correction. If the relative area delta is −1 or if the input geometry is empty, a single side reduction may return an empty geometry. An inner reduction of a geometry with dimension less than 2 may return an empty geometry. If a relative area delta is 0, a single side reduction may return the same input geometry. An outer reduction of a geometry with dimension less than 2, may return the same input geometry. For area deltas greater than −1 and non-empty input geometries with dimensions greater than 2, the result may always be a non-empty geometry, while area deltas between [−1, 0] may trigger inner reductions, and area deltas greater than 0 may trigger outer reductions. Resultant geometries may always have fewer points than the original geometry, where an exception to this rule is the GeometryCollection type because a union can add new points while resolving GeometryCollection self-overlapping parts. The difference in the areas of the input and resulting geometries may never be greater than a specified area delta/tolerance/threshold (e.g., 0<=abs(obtainedAreaDelta)<=abs(specifiedAreaDelta)). Reducible shapes may only be polygons, multi-polygons, and GeometryCollections made of them, and these shapes may be reduced according to the embodiments described herein. If an input geometry is of a type CurvePolygon, a single side reduction may return the same input geometry. If the input geometry is a GeometryCollection, for an inner reduction the result may not contain shapes (GeometryCollection parts) for which dimensions are less than 2. If an input geometry is of type GeometryCollection, for an outer reduction the result may contain all shapes (GeometryCollection parts) for which dimensions are less than 2.

The additional examples and embodiments described in this Section may be applicable to examples disclosed in any other Section or subsection of this disclosure.

A hardware system is described herein. The hardware system may be configured and enabled in various ways for cascade elimination of candidates in spatial relation operations, as described herein. The hardware system includes data manager logic, reduction manager logic, and operation support logic. The data manager logic of the hardware system is configured to receive a first set of data points defining an original geometry having a first area and also having a first number of vertices each of which are associated with respective ones of the first set of data points. The reduction manager logic of the hardware system is configured to remove at least one data point from the first set through a single side reduction, and form, based on removed data points, a second set of data points representing a modified version of the original geometry, the modified version having a second area that is different from the first area and also having at least one less vertex than the first number of vertices. The operation support logic of the hardware system is configured to perform an operation based on the second set to generate a result representative of performance of the operation based on the first set.

In an embodiment of the hardware system, the reduction manager logic further configured to remove a data point from the first set through a first single side reduction that includes an inner-reduction, and remove the data point from the first set through a second single side reduction that includes an outer-reduction.

In an embodiment of the hardware system, the operation includes spatial relation processing of geometric objects in a geometric object set against the second set, and the operation support logic is further configured to mark at least one geometric object in the geometric object set as a true positive relation or a true negative relation based on the result, remove the at least one geometric object from the geometric object set and from further spatial relation processing of the operation, and subsequently continue to perform the operation based on the first set or the second set, and on remaining geometric objects in the geometric object set.

In an embodiment, the hardware system further includes cost manager logic. In the embodiment, the reduction manager logic is configured to remove the first data points and to remove the second data points according to a first area tolerance that specifies a deviation for the second area with respect to the first area. The operation support logic is further configured to mark one or more additional geometric objects in the geometric object set as true positive relations or a true negative relations, and remove the one or more additional geometric objects from the geometric object set and from further spatial relation processing of the operation. The cost manager logic, subsequent to the one or more additional geometric objects being removed from the geometric object set, is configured to determine a time for processing a next geometric object of the geometric object set at which a resource cost to perform one or more additional single side reductions is a specific percentage of an original cost of the operation as the operation progresses. The reduction manager logic is further configured to remove, at the time, one or more data points from the first set to re-generate the second set, as the one or more additional single side reductions, according to a second area tolerance that specifies less deviation for the second area with respect to the first area than the first area tolerance, and the operation support logic being further configured to further continue to perform the operation on the re-generated second set and further remaining geometric objects in the geometric object set.

In an embodiment of the hardware system, the reduction manager logic is configured to perform iterations of nested loops of inner reductions within outer reductions to remove one or more data points from the first set to re-generate the second set, and the hardware system further includes cost manager logic. The cost manager logic is configured to determine a cost savings of a first iteration that has been performed, apply the cost savings to an original cost for the operation to generate a modified original cost, determine a time for processing a next geometric object of the geometric object set at which a resource cost to perform a second iteration is a specific percentage of the modified original cost of the operation as the operation progresses, and cause the reduction manager logic to perform the second iteration at the time. In the embodiment, the operation support logic is further configured to further continue to perform the operation on the re-generated second set and remaining geometric objects in the geometric object set.

In an embodiment, the hardware system further includes union generator logic. In the embodiment, the original geometry is a multi-polygon geometry that includes a first sub-polygon defined by a third set of data points and having a first sub-area of the first area, and a second sub-polygon defined by a fourth set of data points having a second sub-area of the first area, the third set of data points and the fourth set of data points being included in the first set of data points, and the first sub-area and the second sub-area being separate, non-overlapping areas. In the embodiment, the reduction manager logic is further configured to remove the data point from the third set to form a fifth set of data points representing a modified version of the first sub-polygon that has a third sub-area that overlaps with the second sub-area. In the embodiment, the union generator logic configured to form a third sub-polygon having an area that includes the second sub-area, the third sub-area, and an intermediate area as a union of the modified version of the first sub-polygon and the second sub-polygon, and the reduction manager logic further configured to generate the second set to exclude ones of the or the fifth set within the third sub-area, to include other ones of the fourth set and the fifth set that are part of a perimeter of the third sub-polygon, and to include at least two new data points corresponding to intersection points of a perimeter of the first sub-polygon and a perimeter of the second sub-polygon.

In an embodiment of the hardware system, a data point of the first set has a preceding neighbor data point of the first set and a following neighbor data point of the first set in series along a perimeter of the original geometry that, with the data point, form a triangle with their respective vertices, the triangle having two sides corresponding to line segments of the perimeter and a new side corresponding to a line segment between the preceding neighbor data point and the following neighbor data point. In the embodiment, the reduction manager logic is further configured to, prior to removal of the at least one data point, determine that the triangle has an area that is smaller than each other triangle associated with other data points of the first set, and remove the data point based on the area of the triangle being smaller, the new line segment becoming a portion of the perimeter.

In an embodiment of the hardware system, the reduction manager logic is further configured to, prior to the operation being performed, remove one or more additional data points from the first set to generate the second set, based on areas of triangles corresponding to the one or more additional data points, until a final area of a final modified version of the original geometry represented by the second set differs from the first area by a threshold amount, and/or remove a data point from the first set to generate the second set based on proximity of the data point to another data point in the first set.

A computer-implemented method is also described herein. The computer-implemented method may be for cascade elimination of candidates in spatial relation operations, as described herein. The computer-implemented method includes receiving a first set of data points defining an original geometry having a first area and also having a first number of vertices each of which are associated with respective ones of the first set of data points. The computer-implemented method also includes removing at least one data point from the first set, through a single side reduction, to form a second set of data points representing a modified version of the original geometry, the modified version having a second area that is different from the first area and also having at least one less vertex than the first number of vertices, and performing an operation based on the second set to generate a result representative of performance of the operation based on the first set.

405599-US-NP

In an embodiment of the computer-implemented method, the removing the at least one data point includes at least one of removing a data point from the first set according to an inner reduction to cause the second area to be less than the first area, or removing the data point from the first set according to an outer reduction to cause the second area to be greater than the first area.

In an embodiment of the computer-implemented method, the operation comprises spatial relation processing of geometric objects in a geometric object set against the second set. In the embodiment, the method further includes marking at least one geometric object in the geometric object set as a true positive relation or a true negative relation based on the result, removing the at least one geometric object from the geometric object set and from further spatial relation processing of the operation, and subsequently continuing performing the operation based on the first set or the second set, and on remaining geometric objects in the geometric object set.

In an embodiment of the computer-implemented method, the removing the at least one data point from the first set is performed according to a first area tolerance that specifies a deviation for the second area with respect to the first area, and the continuing performing the operation includes marking one or more additional geometric objects in the geometric object set as true positive relations or a true negative relations, and removing the one or more additional geometric objects from the geometric object set and from further spatial relation processing of the operation. In the embodiment, the method further includes, subsequent to the removing the one or more additional geometric objects, determining a time for processing a next geometric object of the geometric object set at which a resource cost of performing one or more additional single side reductions is a specific percentage of an original cost of the operation as the operation progresses, removing, at the time, one or more data points from the first set, to re-generate the second set, as the one or more additional single side reductions, according to a second area tolerance that specifies less deviation for the second area with respect to the first area than the first area tolerance, and further continuing performing the operation on the re-generated second set and further remaining geometric objects in the geometric object set.

In an embodiment of the computer-implemented method, the removing the at least one data point comprises removing one or more data points from the first set to re-generate the second set via iterations of nested loops of inner reductions within outer reductions. In the embodiment, the method further includes determining a cost savings of a first iteration that has been performed, applying the cost savings to an original cost for the operation to generate a modified original cost, determining a time for processing a next geometric object of the geometric object set at which a resource cost to perform a second iteration is a specific percentage of the modified original cost of the operation as the operation progresses, performing the second iteration at the time, and further continuing performing the operation on the re-generated second set and remaining geometric objects in the geometric object set.

In an embodiment of the computer-implemented method, the original geometry is a multi-polygon geometry that includes a first sub-polygon defined by a third set of data points and having a first sub-area of the first area, and a second sub-polygon defined by a fourth set of data points having a second sub-area of the first area, the third set of data points and the fourth set of data points being included in the first set of data points, and the first sub-area and the second sub-area being separate, non-overlapping areas.

In an embodiment of the computer-implemented method, the removing the data point from the first set according to an outer reduction includes removing the data point from the third set to form a fifth set of data points representing a modified version of the first sub-polygon that has a third sub-area that overlaps with the second sub-area, and performing a union of the modified version of the first sub-polygon and the second sub-polygon. In the embodiment, performing a union includes forming a third sub-polygon having an area that includes the second sub-area, the third sub-area, and an intermediate area, and generating the second set to exclude ones of the fourth set or the fifth set within the third sub-area, to include other ones of the fourth set and the fifth set that are part of a perimeter of the third sub-polygon, and to include at least two new data points corresponding to intersection points of a perimeter of the first sub-polygon and a perimeter of the second sub-polygon.

In an embodiment of the computer-implemented method, a data point of the first set has a preceding neighbor data point of the first set and a following neighbor data point of the first set in series along a perimeter of the original geometry that, with the data point, form a triangle with their respective vertices, the triangle having two sides corresponding to line segments of the perimeter and a new side corresponding to a line segment between the preceding neighbor data point and the following neighbor data point. In the embodiment, the method further includes prior to the removing, determining that the triangle has an area that is smaller than each other triangle associated with other data points of the first set, and performing the removing based on the area of the triangle being smaller, the new line segment becoming a portion of the perimeter.

In an embodiment, the computer-implemented method further includes, prior to the performing, removing one or more additional data points from the first set to generate the second set, based on areas of triangles corresponding to the one or more additional data points, until a final area of a final modified version of the original geometry represented by the second set differs from the first area by a threshold amount.

In an embodiment of the computer-implemented method, the original geometry is a representation of a geometry area, a geographic area, or a governmental area, and the operation includes a spatial query that determines if one or more geometric objects are within a perimeter of the modified version, if one or more geometric objects are contained by the modified version, or if one or more geometric objects intersect the modified version.

A computer-readable storage medium having program instructions recorded thereon that, when executed by a processing device, perform a method, is also described. The method may be for cascade elimination of candidates in spatial relation operations, as described herein. The method includes receiving a first set of data points defining an original geometry having a first area and also having a first number of vertices each of which are associated with respective ones of the first set of data points, and removing at least one data point from the first set, through a single side inner reduction based on a first area tolerance, to form a second set of data points representing a modified version of the original geometry, the modified version having a second area that is less than the first area and also having at least one less vertex than the first number of vertices. The method also includes performing an operation based on the second set to generate a true-positive result, for a spatial relation of a first geometric object, that is representative of performance of the operation based on the first set. The method further includes removing one or more data points from the first set, through a single side outer reduction based on the first area tolerance, to re-form the second set of data points representing a modified version of the original geometry, the modified version having a second area that is greater than the first area and also having one or more fewer vertex than the first number of vertices, continuing performing the operation based on the re-formed second set to generate a true-negative result, for a spatial relation of a second geometric object, that is representative of performance of the operation based on the first set, and further continuing performing the operation based on the first set, while excluding the first geometric object and the second geometric object from processing for the operation, to determine true-positive results and true-negative results for additional geometric objects.

In an embodiment of the computer-readable storage medium, the method further includes, subsequent to said further continuing performing the operation based on the first set, determining a time for processing a next geometric object of the geometric object set at which a resource cost of performing one or more additional single side reductions is a specific percentage of an original cost of the operation as the operation progresses based on the first set, removing, at the time, one or more data points from the first set, to re-generate the second set, as the one or more additional single side reductions, according to a second area tolerance that specifies less deviation for the second area with respect to the first area than the first area tolerance, and further continuing performing the operation on the re-generated second set and remaining geometric objects in the geometric object set.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A hardware system for cascade elimination of candidates in spatial relation operations, the system comprising:
   logic configured to:
   receive a query specifying a spatial relation operation to calculate the spatial relationship between an original geometry and a set of candidate geometric objects, the original geometry having a first number of vertices each of which are associated with respective data points of a first set of data points;
   perform one or more single side reductions to remove at least one data point from the first set of data points to form a second set of data points representing a modified geometry having at least one less vertex than the first number of vertices;
   perform the spatial relation operation on a first candidate of the set of candidate geometric objects using the second set of data points to generate a first result representative of the spatial relationship between the first candidate and the original geometry;
   determine, prior to performing the spatial relation operation on a next candidate of the set of candidate geometric objects, that a cost of performing one or more additional single side reductions is a specific percentage of a cumulative cost of the spatial relation operation based on the original geometry;
   perform the one or more additional single side reductions to remove one or more additional data points from the first set of data points to generate a re-generated second set of data points; and
   perform the spatial relation operation on the next candidate using the re-generated second set of data points to generate a second result representative of the spatial relationship between the next candidate and the original geometry.

2. The hardware system of claim 1, wherein the logic is further configured to:
remove a data point from the first set of data points through a first single side reduction that includes an inner-reduction; and
remove the data point from the first set of data points through a second single side reduction that includes an outer-reduction.

3. The hardware system of claim 1,
wherein the original geometry is a multi-polygon geometry that includes a first sub-polygon defined by a third set of data points and having a first sub-area of the first area, and a second sub-polygon defined by a fourth set of data points having a second sub-area of the first area, the third set of data points and the fourth set of data points being included in the first set of data points, and the first sub-area and the second sub-area being separate, non-overlapping areas; and
the logic further configured to:
remove the data point from the third set to form a fifth set of data points representing a modified version of the first sub-polygon that has a third sub-area that overlaps with the second sub-area;
form a third sub-polygon having an area that includes the second sub-area, the third sub-area, and an intermediate area as a union of the modified version of the first sub-polygon and the second sub-polygon; and
generate the second set to exclude ones of the fourth set or the fifth set within the third sub-area, to include other ones of the fourth set and the fifth set that are part of a perimeter of the third sub-polygon, and to include at least two new data points corresponding to intersection points of a perimeter of the first sub-polygon and a perimeter of the second sub-polygon.

4. The hardware system of claim 1, wherein a data point of the first set of data points has a preceding neighbor data point of the first set of data points and a following neighbor data point of the first set of data points in series along a perimeter of the original geometry that, with the data point, form a triangle with their respective vertices, the triangle having two sides corresponding to line segments of the perimeter and a new side corresponding to a line segment between the preceding neighbor data point and the following neighbor data point; and
the logic further configured to:
determine that the triangle has an area that is smaller than each other triangle associated with other data points of the first set of data points; and
remove the data point based on the area of the triangle being smaller, the new line segment becoming a portion of the perimeter.

5. The hardware system of claim 2, wherein the logic is further configured to:
mark at least one candidate geometric object in the set of candidate geometric objects as a true positive relation or a true negative relation based on the first result or the second result;
remove the at least one candidate geometric object from the set of candidate geometric objects; and
subsequently perform the spatial relation operation on remaining candidate geometric objects in the set of candidate geometric objects.

6. The hardware system of claim 5,
wherein the one or more single side reductions to remove the at least one data point from the first set of data points are performed based on a first area tolerance that specifies a deviation for the area of the modified geometry with respect to the area of the original geometry; and
wherein the one or more additional single side reductions are performed based on a second area tolerance that specifies less deviation for the area the geometry represented by the re-generated second set of data points with respect to the area of the original geometry.

7. The hardware system of claim 5, wherein the logic is further configured to perform iterations of nested loops of inner reductions within outer reductions to remove one or more data points from the first set to generate the re-generated second set of data points;
determine a cost savings of a first iteration that has been performed;
apply the cost savings to the cumulative cost to generate a modified cumulative cost;
determine, prior to performing the spatial relation operation on a next candidate of the set of candidate geometric objects, that a cost of performing a second iteration is a specific percentage of the modified cumulative cost; and
perform, in response to determining that the cost of performing the second iteration is a specific percentage of the modified cumulative cost, the second iteration.

8. The hardware system of claim 4, wherein the logic is further configured to:
prior to performing the spatial relation operation on the first candidate geometric object, remove one or more additional data points from the first set of data points to generate the second set of data points, based on areas of triangles corresponding to the one or more additional data points, until an area of the modified geometry represented by the second set of data points differs from the area of the original geometry by a threshold amount; or
remove a data point from the first set of data points to generate the second set of data points based on proximity of the data point to another data point in the first set of data points.

9. A computer-implemented method, comprising:
receiving a query specifying a spatial relation operation to calculate the spatial relationship between an original geometry and a set of candidate geometric objects, the original geometry having a first number of vertices each of which are associated with respective data points of a first set of data points;
performing one or more single side reductions to remove at least one data point from the first set of data points to form a second set of data points representing a modified geometry having at least one less vertex than the first number of vertices;
performing the spatial relation operation on a first candidate of the set of candidate geometric objects using the second set of data points to generate a first result representative of the spatial relationship between the first candidate and the original geometry;
determining, prior to performing the spatial relation operation on a next candidate of the set of candidate geometric objects, that a cost of performing one or more additional single side reductions is a specific percentage of a cumulative cost of the spatial relation operation based on the original geometry;

performing the one or more additional single side reductions to remove one or more additional data points from the first set of data points to generate a re-generated second set of data points; and performing the spatial relation operation on the next candidate using the re-generated second set of data points to generate a second result representative of the spatial relationship between the next candidate and the original geometry.

10. The computer-implemented method of claim 9, wherein said performing one or more single side reductions to remove the at least one data point from the first set of data points comprises at least one of:

removing a data point from the first set of data points according to an inner reduction to cause the area of the modified geometry to be less than the area of the original geometry; or removing the data point from the first set of data points according to an outer reduction to cause the area of the modified geometry to be greater than the area of the original.

11. The computer-implemented method of claim 9, wherein a data point of the first set of data points has a preceding neighbor data point of the first set of data points and a following neighbor data point of the first set of data points in series along a perimeter of the original geometry that, with the data point, form a triangle with their respective vertices, the triangle having two sides corresponding to line segments of the perimeter and a new side corresponding to a line segment between the preceding neighbor data point and the following neighbor data point;

the method further comprising:
determining that the triangle has an area that is smaller than each other triangle associated with other data points of the first set of data points; and
removing the data point based on the area of the triangle being smaller, the new line segment becoming a portion of the perimeter.

12. The computer-implemented method of claim 9, wherein the original geometry is a representation of a geometry area, a geographic area, or a governmental area; and wherein the spatial relation operation determines if one or more of the candidate geometric objects are within a perimeter of the modified geometry, if one or more of the candidate geometric objects are contained by the modified geometry, or if one or more of the candidate geometric objects intersect the modified geometry.

13. The computer-implemented method of claim 10, further comprising:

marking at least one candidate geometric object in the set of candidate geometric objects as a true positive relation or a true negative relation based on the first result or the second result;
removing the at least one candidate geometric object from the set of candidate geometric objects; and
subsequently performing the spatial relation operation on remaining candidate geometric objects in the set of candidate geometric objects.

14. The computer-implemented method of claim 13, wherein said performing the one or more single side reductions to remove the at least one data point from the first set of data points is performed according to a first area tolerance that specifies a deviation for the area of the modified geometry with respect to the area of the original geometry; and wherein performing the one or more additional single side reductions is based on a second area tolerance that specifies less deviation for the area the geometry represented by the re-generated second set of data points with respect to the area of the original geometry.

15. The computer-implemented method of claim 13, wherein said performing the one or more additional single side reductions comprises iterations of nested loops of inner reductions within outer reductions;

the method further comprising:
determining a cost savings of a first iteration that has been performed;
applying the cost savings to the cumulative cost to generate a modified cumulative cost;
determining, prior to performing the spatial relation operation on a next candidate of the set of candidate geometric objects, that a cost of performing a second iteration is a specific percentage of the modified cumulative cost; and
performing, in response to determining that the cost of performing the second iteration is a specific percentage of the modified cumulative cost, the second iteration.

16. The computer-implemented method of claim 10, wherein the original geometry is a multi-polygon geometry that includes a first sub-polygon defined by a third set of data points and having a first sub-area of the first area, and a second sub-polygon defined by a fourth set of data points having a second sub-area of the first area, the third set of data points and the fourth set of data points being included in the first set of data points, and the first sub-area and the second sub-area being separate, non-overlapping areas.

17. The computer-implemented method of claim 16, wherein said removing the data point from the first set of data points according to an outer reduction comprises:

removing the data point from the third set to form a fifth set of data points representing a modified version of the first sub-polygon that has a third sub-area that overlaps with the second sub-area;
performing a union of the modified version of the first sub-polygon and the second sub-polygon, said performing a union comprising:
forming a third sub-polygon having an area that includes the second sub-area, the third sub-area, and an intermediate area, and generating the second set to exclude ones of the fourth set or the fifth set within the third sub-area, to include other ones of the fourth set and the fifth set that are part of a perimeter of the third sub-polygon, and to include at least two new data points corresponding to intersection points of a perimeter of the first sub-polygon and a perimeter of the second sub-polygon.

18. The computer-implemented method of claim 11, further comprising:

prior to said performing the spatial relation operation on the first candidate geometric object, removing one or more additional data points from the first set of data points to generate the second set of data points, based on areas of triangles corresponding to the one or more additional data points, until an area of the modified geometry represented by the second set of data points differs from the area of the original geometry by a threshold amount.

19. A computer-readable storage medium having program instructions recorded thereon that, when executed by a processing device, perform a method comprising:

receiving a query specifying a spatial relation operation to calculate the spatial relationship between an original geometry and a set of candidate geometric objects, the original geometry having a first number of vertices each of which is associated with respective ones of a first set of data points;

performing one or more single side reductions to remove at least one data point from the first set of data points to form a second set of data points representing a modified geometry having at least one less vertex than the first number of vertices;

performing the spatial relation operation on a first candidate of the set of candidate geometric objects using the second set of data points to generate a result representative of the spatial relationship between the first candidate and the original geometry;

determining, prior to performing the spatial relation operation on a next candidate of the set of candidate geometric objects, that a cost of performing one or more additional single side reductions is a specific percentage of a cumulative cost of the spatial relation operation based on the original geometry;

performing the one or more additional single side reductions to remove one or more additional data points from the first set of data points to generate a re-generated second set of data points; and performing the spatial relation operation on the next candidate using the re-generated second set of data points to generate a result representative of the spatial relationship between the next candidate and the original geometry.

20. The computer-readable storage medium of claim 19, wherein the method further comprises:

marking at least one candidate geometric object in the set of candidate geometric objects as a true positive relation or a true negative relation based on the first result or the second result;

removing the at least one candidate geometric object from the set of candidate geometric objects; and subsequently performing the spatial relation operation on remaining candidate geometric objects.

\* \* \* \* \*